US007129941B2

(12) United States Patent
Deering et al.

(10) Patent No.: US 7,129,941 B2
(45) Date of Patent: Oct. 31, 2006

(54) SAMPLE REPLICATION MODE WITH DEPTH VALUE CALCULATION

(75) Inventors: Michael F. Deering, Los Altos, CA (US); Michael G. Lavelle, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 388 days.

(21) Appl. No.: 10/392,283

(22) Filed: Mar. 19, 2003

(65) Prior Publication Data

US 2004/0183795 A1 Sep. 23, 2004

(51) Int. Cl.
*G06T 15/40* (2006.01)
*G06T 1/00* (2006.01)

(52) U.S. Cl. ...................... 345/422; 345/501
(58) Field of Classification Search ................ 345/422, 345/421, 502, 506, 536, 505, 538
See application file for complete search history.

(56) References Cited

U.S. PATENT DOCUMENTS

| 4,953,107 | A | * | 8/1990 | Hedley et al. ............... 345/422 |
| 5,388,206 | A | * | 2/1995 | Poulton et al. ............. 345/505 |
| 5,850,489 | A | * | 12/1998 | Rich .......................... 382/304 |
| 6,052,125 | A | * | 4/2000 | Gardiner et al. ............ 345/421 |
| 6,407,736 | B1 | * | 6/2002 | Regan ........................ 345/422 |
| 6,577,317 | B1 | * | 6/2003 | Duluk et al. ................ 345/506 |
| 6,618,054 | B1 | | 9/2003 | Deering |
| 6,650,323 | B1 | | 11/2003 | Naegle et al. |
| 6,774,910 | B1 | * | 8/2004 | Lewis ........................ 345/611 |
| 6,795,076 | B1 | * | 9/2004 | Deering et al. ............. 345/502 |
| 6,864,893 | B1 | * | 3/2005 | Zatz ........................... 345/503 |
| 2003/0169251 | A1 | | 9/2003 | Deering |

OTHER PUBLICATIONS

Watt et al., "Advanced Animation and Rendering Techniques", ACM Press, 1992, pp. 120-122, 131-137.*
Foley et al., "Computer Graphics: Principles and Practice", Addison Wesley, 2nd ed. in C, 1996, pp. 619-620, 642-646, 693-695, 886-887, 893-896, 907-910.*
Cook et al., "The Reyes image rendering architecture", Aug. 1987 ACM SIGGRAPH Computer Graphics , Proceedings of the 14th annual conference on Computer graphics and interactive techniques, vol. 21 Issue 4, pp. 95-102.*
DeLoura et al., "Game Programming Gems 2", Charles River Media 2001, pp. 406-410.*

* cited by examiner

*Primary Examiner*—Ulka Chauhan
*Assistant Examiner*—Daniel Hajnik
(74) *Attorney, Agent, or Firm*—Meyertons Hood Kivlin Kowert & Goetzel, P.C.; Jeffrey C. Hood

(57) ABSTRACT

A system and method are disclosed for rendering polygons. Parameter values may be rendered for only one sample position of a plurality of neighboring sample positions within a polygon. The parameter values rendered for the one sample position may then be transmitted to one or more memories and conditionally stored in a plurality of memory locations that correspond to the plurality of neighboring sample positions. Transmitting parameter values to one or more memories may be achieved in a single transaction. Depth values may be rendered for each sample position in the plurality of neighboring sample positions. Depth value data may be compressed. In some embodiments, the one or more memories may be configured to determine depth values for each of the neighboring sample positions.

37 Claims, 16 Drawing Sheets

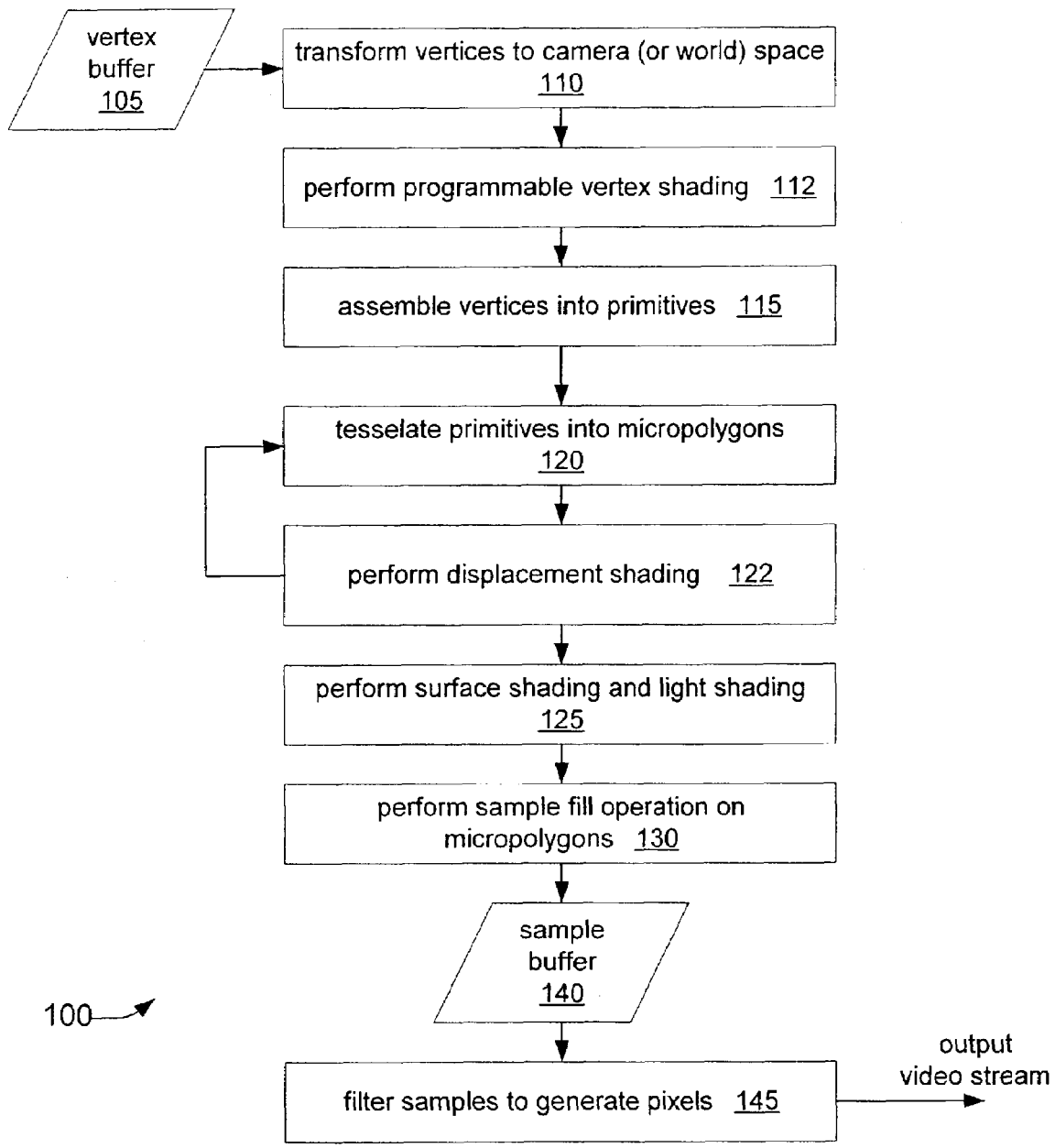
Fig. 1: Rendering Pipeline

SAMPLE REPLICATION MODE WITH DEPTH VALUE CALCULATION

BACKGROUND OF THE INVENTION

1. Field of the Invention

This invention relates generally to the field of computer graphics and, more particularly, to a high performance graphics system which implements super-sampling.

2. Description of the Related Art

Early graphics systems were limited to two-dimensional (2D) graphics, were configured to compute a gray scale value for each pixel displayed, and acted as simple translators or interfaces to a display device. Modern high performance graphics systems, however, may support three-dimensional (3D) graphics, may include super-sampling, and may include capability for one or more special effects such as anti-aliasing, texturing, shading, fogging, alpha-blending, and specular highlighting. 3D graphics data may be several orders of magnitude larger than comparable 2D graphics data. 3D graphics data may include a set of information components for each vertex of the geometric primitives used to model the objects to be imaged.

In recent years, the demand for high performance graphics systems that can render complex three-dimensional (3D) objects and scenes has increased substantially. This increase is at least in part due to the demand for new applications such as computer-generated animation for motion pictures, virtual reality simulators/trainers, and interactive computer games. These new applications place tremendous computational loads upon graphics systems. Modern computer displays have also improved and have a significantly higher pixel resolution, greater color depth, and are able to display more complex images with higher refresh rates than earlier models. Consequently, modern high performance graphics systems incorporate graphics processors with a great deal of complexity and power, and the color value of one pixel may be the accumulated result of many calculations involving several models and mathematical approximations.

With each new generation of graphics system, there is more image data to process, the processing is more complex, and there is less time in which to process it. This need for more processing power may be addressed with a combination of one or more of additional hardware, more efficient hardware, more efficient algorithms, and/or selective applications of alternative algorithms.

SUMMARY OF THE INVENTION

Processing speed may be enhanced by a system and method that renders parameter values for one selected sample position of a plurality of neighboring sample positions and then conditionally stores the parameter values in a plurality of memory locations that correspond to the neighboring sample positions. Depth values may be determined for each of the neighboring sample positions rather than duplicated, and may therefore reduce occurrences of jagged intersections of intersecting planes or surfaces. This mode of storing is referred to as sample replication mode with depth value calculation (also referred to herein as sample grouping mode). Parameter values may include, but are not limited to one or more of color values (red, green, and/or blue) and alpha. Conditional storage of parameter values is dependent on one or more tests that may be performed in processor enhanced memories and may include a Z component comparison, one or more window ID tests, and one or more stencil tests.

In some embodiments, the user may specify sample grouping mode for one or more graphics objects, and a tag for sample grouping mode may be incorporated with the graphics data for polygons corresponding to the objects. In other embodiments, the storage mode may be set for all processing, for the processing of selected regions of the image such as the sky, or for processing large objects with insubstantial differences in color. In still other embodiments, the mode may be varied dynamically in response to a need for faster processing of a very complex image to provide continuous real time display or for situations where the complexity of the image changes dramatically in real time.

A system capable of implementing sample grouping mode may include a first processor, one or more render processors, a plurality of processor enhanced memories, and a bus connecting the render processors and the plurality of memories. The first processor may receive and/or generate 3-D graphics data corresponding to a graphics object. The 3-D graphics data may include vertex data and instructions for selection of a sample grouping mode for conditionally storing rendered parameter values for one selected sample in a plurality of memory locations corresponding to a plurality of samples.

In some embodiments, sample locations are pre-determined. Sample values may be stored in an ordered list for a specified region of sample space (such as the region of sample space corresponding to a render pixel). The position of the sample in the ordered list may be used to select a corresponding sample location from an ordered list of pre-selected sample locations. Pre-selected sample locations may be specified by a look-up table, a look-up table tiled a sufficient number of times to span sample space, a specified set of permutations of a look-up table that span sample space, a specified grid, or a jitter table.

The plurality of memories may include means for determining a sample location corresponding to a sample and a depth value for each sample location determined. The means for determining sample locations may include one or more sample location units and one or more data processors. The data processors may be configured to retrieve a sample location corresponding to a sample from the sample location unit and determine a depth value for the sample location using a depth value for the selected sample and the rate of change of depth at the selected sample.

The parameter values rendered for a selected sample position may be conditionally stored in a plurality of memories with one transaction. In some embodiments, a memory may be sub-divided into a plurality of sections. In other embodiments, a plurality of memory units may be combined to conditionally store parameter values to 16, 32, or 64 memory locations simultaneously.

The render processor may be configured to generate a data capture code. The code may specify which memories will receive the parameter values and each memory or memory section may be configured to read the code and determine which memory locations may conditionally receive the parameter values.

The render processor may also include a data compressor unit configured to compress depth value data for each of the samples in the group of neighboring samples, and the data processors in the memories may also include a data de-compressor unit configured to receive the compressed data, de-compress the data, and output depth values for each of the samples in the group of neighboring samples.

The user may specify sample grouping mode and the number of sample positions $N_{bm}$ included in the group of neighboring sample positions. The first processor may incorporate the specified mode with the graphics data for a polygon. $N_{bm}$ may be less than the number of samples per pixel, equal to the number of samples per pixel, or greater than the number of samples per pixel ($N_{bm}$ is a positive integer greater than 1).

One embodiment of the method includes: receiving vertex data for a polygon that includes the specification of sample grouping mode and the number of neighboring samples to be included in a group (or having sample grouping mode independently specified), selecting a sample position within the polygon, rendering parameter values using the vertex data for the selected sample position, determining parameters defining depth across the polygon, transmitting the parameter values and the depth parameters to a plurality of memories, determining sample locations corresponding to each of the neighboring samples, determining depth values for each sample location using the depth parameters, and conditionally storing the parameter values and each depth value in a corresponding one of the memory locations that correspond to the plurality of neighboring sample positions.

Depth values may be determined in the render processor, compressed in a data compressor unit and sent to data processors in the memories. A data de-compressor unit in the data processors may de-compress the depth values.

BRIEF DESCRIPTION OF THE DRAWINGS

A better understanding of the present invention can be obtained when the following detailed description is considered in conjunction with the following drawings, in which:

FIG. 1 illustrates one set of embodiments of a graphics-rendering pipeline;

Figure 2A:
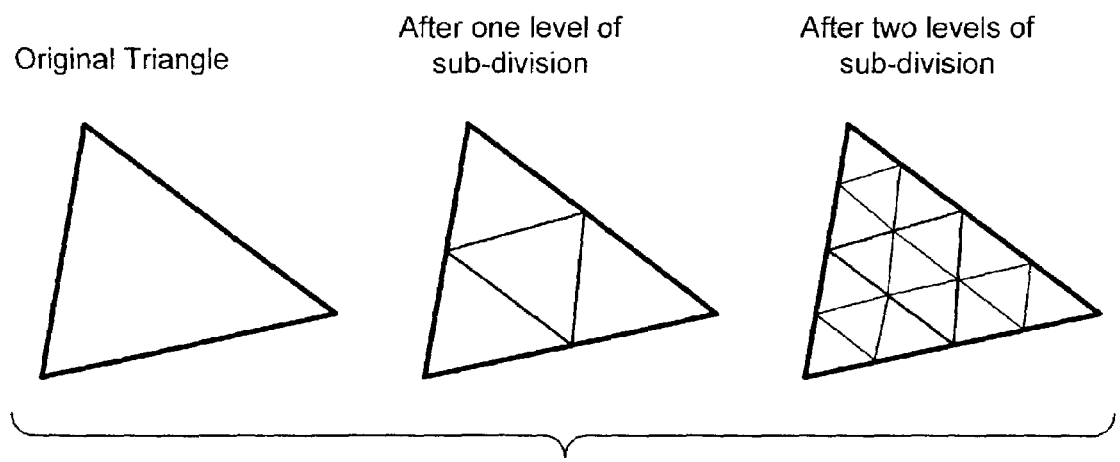
FIG. 2A illustrates one embodiment of a triangle fragmentation process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Various Spaces

The detailed description that follows may be more easily understood if various spaces are first defined:

Model Space: The space in which an object (or set of objects) is defined.

Virtual World Space: The space in which a scene comprising a collection of objects and light sources may be constructed. Each object may be injected into virtual world space with a transformation that achieves any desired combination of rotation, translation and scaling of the object. In older terminology, virtual world space has often been referred to simply as "world space".

Camera Space: A space defined by a transformation $T^{VC}$ from virtual world space. The transformation $T^{VC}$ may achieve a combination of translation, rotation, and scaling. The translation and rotation account for the current position and orientation of a virtual camera in the virtual world space. The coordinate axes of camera space are rigidly bound to the virtual camera. In OpenGL, camera space is referred to as "eye space".

Clipping Space: A space defined by a transform $T^{CX}$ from camera space before any perspective division by the W coordinate, and is used as an optimization in some clipping algorithms. In clipping space, the sides of the perspective-projection view volume may occur on the bounding planes $X = \pm W$, $Y = \pm W$, $Z = 0$ and $Z = -W$. Clipping space is not mandated by the abstract rendering pipeline disclosed herein, and is defined here as a convenience for hardware implementations that choose to employ it.

Image Plate Space: A two-dimensional space with a normalized extent from −1 to 1 in each dimension, created after perspective division by the W coordinate of clipping space, but before any scaling and offsetting to convert coordinates into render pixel space).

Pixel Plate Space: A two-dimensional space created after perspective division by the W coordinate of camera space, but before any scaling and offsetting to convert coordinates into render pixel space.

Render Pixel Space: A space defined by a transform $T^{IR}$ from image plate space (or a transform $T^{JR}$ from pixel plate space). The transform $T^{IR}$ (or $T^{JR}$) scales and offsets points from image plate space (or pixel plate space) to the native space of the rendered samples. See FIGS. 7 and 8.

Video Pixel Space: According to the abstract rendering pipeline defined herein, a filtering engine generates virtual pixel positions in render pixel space (e.g., as suggested by the plus markers of FIG. 8), and may compute a video pixel at each of the virtual pixel positions by filtering samples in the neighborhood of the virtual pixel position. The horizontal displacement $\Delta x$ and vertical displacement $\Delta y$ between virtual pixel positions are dynamically programmable values. Thus, the array of virtual pixel positions is independent of the array of render pixels. The term "video pixel space" is used herein to refer to the space of the video pixels.

Texture Vertex Space: The space of the texture coordinates attached to vertices. Texture vertex space is related to texture image space by the currently active texture transform. (Effectively, every individual geometry object defines its own transform from texture vertex space to model space, by the association of the position, texture coordinates, and possibly texture coordinate derivatives with all the vertices that define the individual geometry object.)

Texture Image Space: This is a space defined by the currently active texture transform. It is the native space of texture map images.

Light Source Space: A space defined by a given light source.

Abstract Rendering Pipeline

FIG. 1 illustrates a rendering pipeline 100 that supports per-pixel programmable shading. The rendering pipeline 100 defines an abstract computational model for the generation of video pixels from primitives. Thus, a wide variety of hardware implementations of the rendering pipeline 100 are contemplated.

Vertex data packets may be accessed from a vertex buffer 105. A vertex data packet may include a position, a normal vector, texture coordinates, texture coordinate derivatives, and a color vector. More generally, the structure of a vertex data packet is user programmable. As used herein the term vector denotes an ordered collection of numbers.

In step 110, vertex positions and vertex normals may be transformed from model space to camera space or virtual world space. For example, the transformation from model space to camera space may be represented by the following expressions:

$$X^C = T^{MC} X^M,$$

$$N^C = G^{MC} n^M.$$

If the normal transformation $G^{MC}$ is not length preserving, the initial camera space vector $N^C$ may be normalized to unit length:

$$n^C = N^C / \text{length}(N^C).$$

For reasons that will become clear shortly, it is useful to maintain both camera space (or virtual world space) position and render pixel space position for vertices at least until after tessellation step 120 is complete. (This maintenance of vertex position data with respect to two different spaces is referred to herein as "dual bookkeeping".) Thus, the camera space position $X^C$ may be further transformed to render pixel space:

$$X^R = T^{CR} X^C.$$

The camera-space-to-render-pixel-space transformation $T^{CR}$ may be a composite transformation including transformations from camera space to clipping space, from clipping space to image plate space (or pixel plate space), and from image plate space (or pixel plate space) to render pixel space.

In step 112, one or more programmable vertex shaders may operate on the camera space (or virtual world space) vertices. The processing algorithm performed by each vertex shader may be programmed by a user. For example, a vertex shader may be programmed to perform a desired spatial transformation on the vertices of a set of objects.

In step 115, vertices may be assembled into primitives (e.g. polygons or curved surfaces) based on connectivity information associated with the vertices. Alternatively, vertices may be assembled into primitives prior to the transformation step 110 or programmable shading step 112.

In step 120, primitives may be tessellated into micropolygons. In one set of embodiments, a polygon may be declared to be a micropolygon if the projection of the polygon in render pixel space satisfies a maximum size constraint. The nature of the maximum size constraint may vary among hardware implementations. For example, in some implementations, a polygon qualifies as a micropolygon when each edge of the polygon's projection in render pixel space has length less than or equal to a length limit $L_{max}$ in render pixel space. The length limit $L_{max}$ may equal one or one-half. More generally, the length limit $L_{max}$ may equal a user-programmable value, e.g., a value in the range [0.5,2.0].

As used herein the term "tessellate" is meant to be a broad descriptive term for any process (or set of processes) that operates on a geometric primitive to generate micropolygons.

Tessellation may include a triangle fragmentation process that divides a triangle into four subtriangles by injecting three new vertices, i.e., one new vertex at the midpoint of each edge of the triangle as suggested by FIG. 2A. The triangle fragmentation process may be applied recursively to each of the subtriangles. Other triangle fragmentation processes are contemplated. For example, a triangle may be subdivided into six subtriangles by means of three bisecting segments extending from each vertex of the triangle to the midpoint of the opposite edge.

Figure 2B:
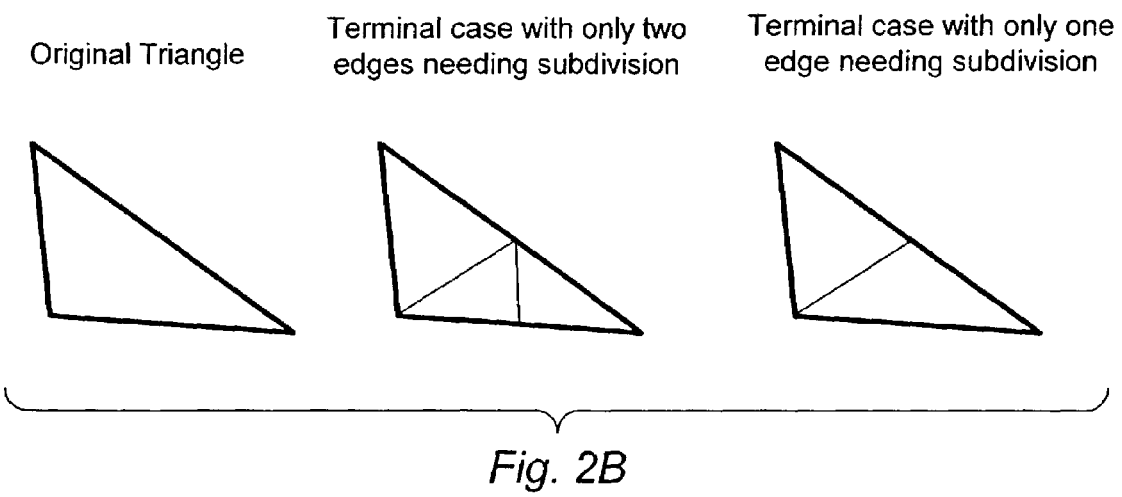
FIG. 2B illustrates several termination criteria for a triangle fragmentation process.

FIG. 2B illustrates means for controlling and terminating a recursive triangle fragmentation. If a triangle resulting from an application of a fragmentation process has all three edges less than or equal to a termination length $L_{term}$, the triangle need not be further fragmented. If a triangle has exactly two edges greater than the termination length $L_{term}$ (as measured in render pixel space), the triangle may be divided into three subtriangles by means of a first segment extending from the midpoint of the longest edge to the opposite vertex, and a second segment extending from said midpoint to the midpoint of the second longest edge. If a triangle has exactly one edge greater than the termination length $L_{term}$, the triangle may be divided into two subtriangles by a segment extending from the midpoint of the longest edge to the opposite vertex.

Figure 3A:
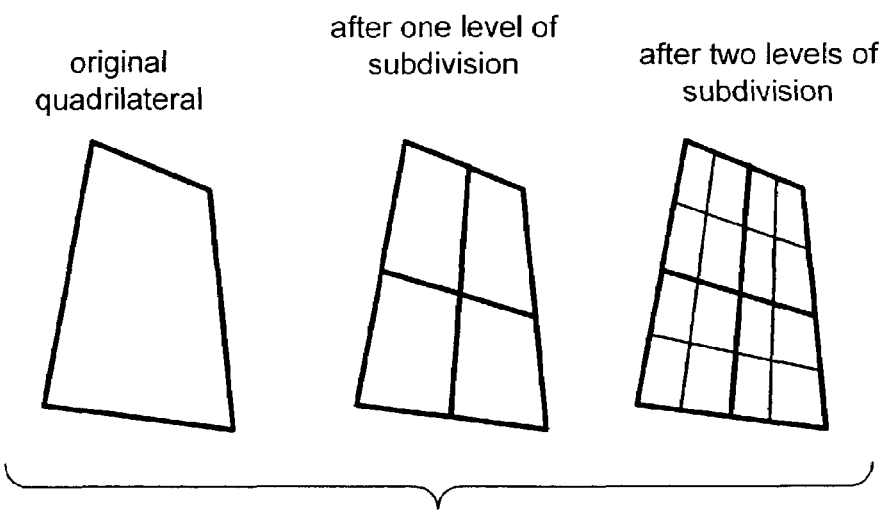
FIG. 3A illustrates one embodiment of a quadrilateral fragmentation process.

Tessellation may also include a quadrilateral fragmentation process that fragments a quadrilateral into four subquadrilaterals by dividing along the two bisectors that each extend from the midpoint of an edge to the midpoint of the opposite edge as illustrated in FIG. 3A. The quadrilateral fragmentation process may be applied recursively to each of the four subquadrilaterals.

Figure 3B:
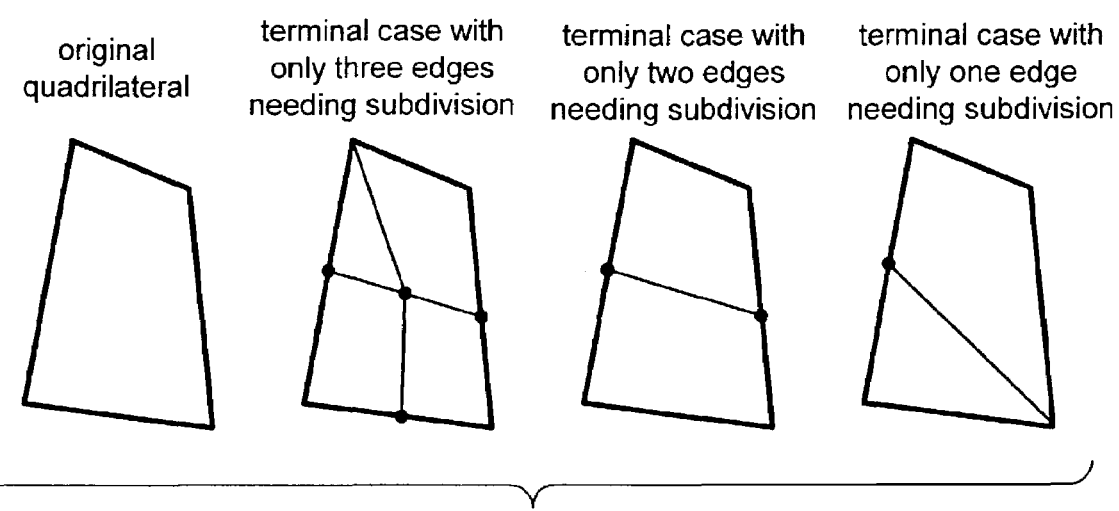
FIG. 3B illustrates several termination criteria for a quadrilateral fragmentation process.

FIG. 3B illustrates means for controlling and terminating a recursive quadrilateral fragmentation. If a quadrilateral resulting from an application of the quadrilateral fragmentation process has all four edges less than or equal to the termination length $L_{term}$, the quadrilateral need not be further fragmented. If the quadrilateral has exactly three edges greater than the termination length $L_{term}$, and the longest and second longest edges are nonadjacent, the quadrilateral may be divided into three subquadrilaterals and a triangle by means of segments extending from an interior point to the midpoints of the three longest edges, and a segment extending from the interior point to the vertex which connects the smallest edge and longest edge. (The interior point may be the intersection of the two lines which each extend from an edge midpoint to the opposite edge midpoint.) If the quadrilateral has exactly two sides greater than the termination length limit $L_{term}$, and the longest edge and the second longest edge are nonadjacent, the quadrilateral may be divided into two subquadrilaterals by means of a segment extending from the midpoint of the longest edge to the midpoint of the second longest edge. If the quadrilateral has exactly one edge greater than the termination length $L_{term}$, the quadrilateral may be divided into a subquadrilateral and a subtriangle by means of a segment extending from the midpoint of the longest edge to the vertex that connects the second longest edge and the third longest edge. The cases given in FIG. 3B are not meant be an exhaustive list of termination criteria.

Figure 4:
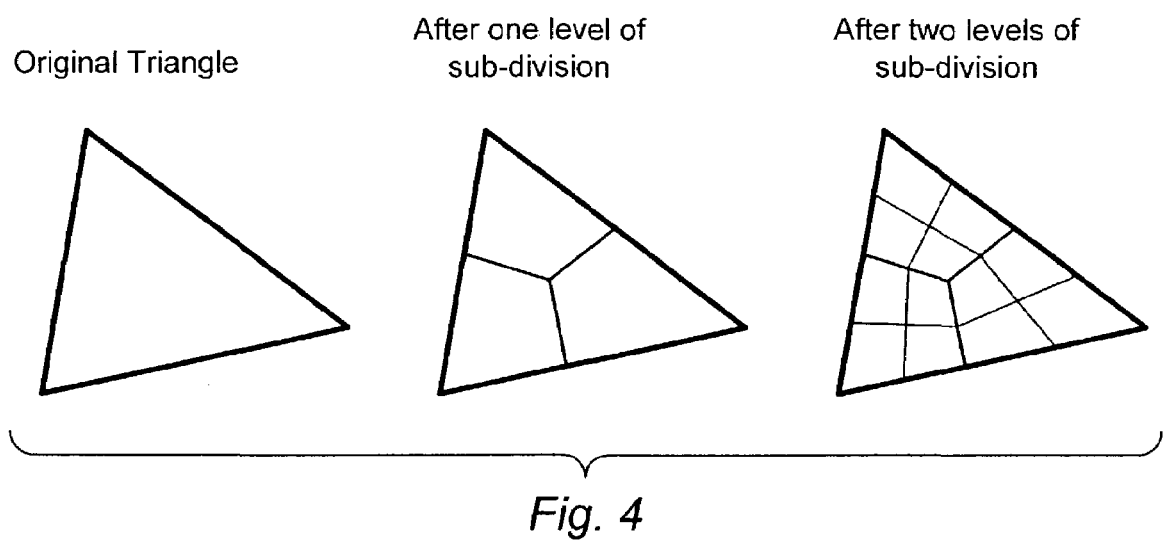
FIG. 4 illustrates one embodiment of a fragmentation process that operates on triangles to generate component quadrilaterals.

In some embodiments, tessellation may include algorithms that divide one type of primitive into components of another type. For example, as illustrated in FIG. 4, a triangle may be divided into three subquadrilaterals by means of segments extending from an interior point (e.g. the triangle centroid) to the midpoint of each edge. (Once the triangle has been the divided into subquadrilaterals, a quadrilateral fragmentation process may be applied recursively to the subquadrilaterals.) As another example, a quadrilateral may be divided into four subtriangles by means of two diagonals that each extend from a vertex of the quadrilateral to the opposite vertex.

Figure 5A:
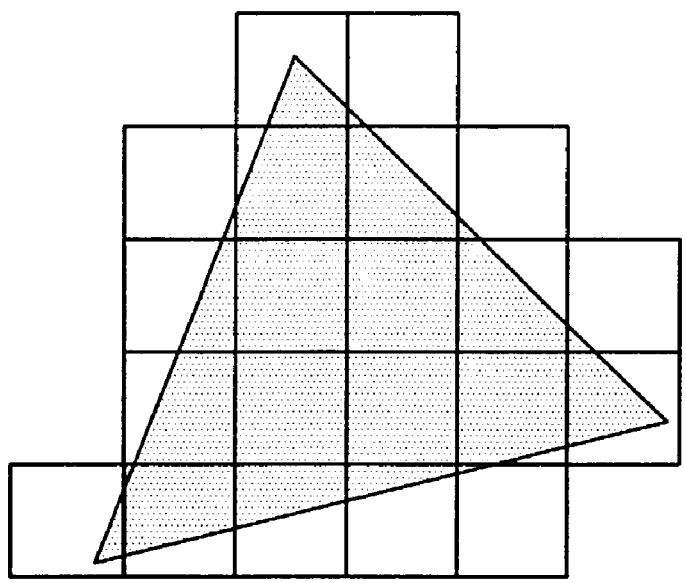
FIGS. 5A and 5B illustrate one embodiment of a method for fragmenting a primitive based on render pixels.
Figure 5B:
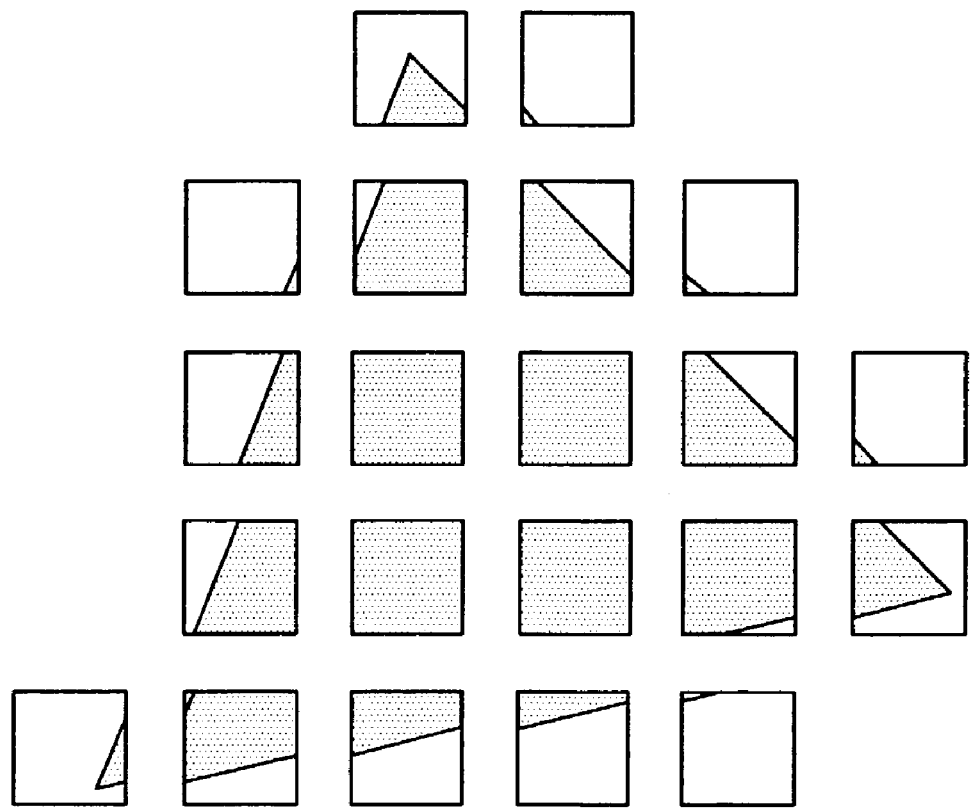

In some embodiments, tessellation may involve the fragmentation of primitives into micropolygons based on an array of render pixels as suggested by FIGS. 5A and 5B. FIG. 5A depicts a triangular primitive as seen in render pixel space. The squares represent render pixels in render pixel space. Thus, the primitive intersects 21 render pixels. Seventeen of these render pixels are cut by one or more edges of the primitive, and four are completely covered by the primitive. A render pixel that is cut by one or more edges of the primitive is referred to herein as a trimmed render pixel (or simply, trimmed pixel). A render pixel that is completely covered by the primitive is referred to herein as a microsquare.

The tessellation process may compute edge-trimming information for each render pixel that intersects a primitive. In one implementation, the tessellation process may compute a slope for an edge of a primitive and an accept bit indicating the side of the edge that contains the interior of the primitive, and then, for each render pixel that intersects the edge, the tessellation process may append to the render pixel (a) the edge's slope, (b) the edge's intercept with the boundary of the render pixel, and (c) the edge's accept bit. The edge-trimming information is used to perform sample fill (described somewhat later).

FIG. 5B illustrates an exploded view of the 21 render pixels intersected by the triangular primitive. Observe that of the seventeen trimmed render pixels, four are trimmed by two primitive edges, and the remaining thirteen are trimmed by only one primitive edge.

In some embodiments, tessellation may involve the use of different fragmentation processes at different levels of scale. For example, a first fragmentation process (or a first set of fragmentation processes) may have a first termination length that is larger than the length limit $L_{max}$. A second fragmentation process (or a second set of fragmentation processes) may have a second termination length that is equal to the length limit $L_{max}$. The first fragmentation process may receive arbitrary sized primitives and break them down into intermediate size polygons (i.e. polygons that have maximum side length less than or equal to the first termination length). The second fragmentation process takes the intermediate size polygons and breaks them down into micropolygons (i.e., polygons that have maximum side length less than or equal to the length limit $L_{max}$).

The rendering pipeline 100 may also support curved surface primitives. The term "curved surface primitive" covers a large number of different non-planar surface patch descriptions, including quadric and Bezier patches, NURBS, and various formulations of sub-division surfaces. Thus, tessellation step 120 may include a set of fragmentation processes that are specifically configured to handle curved surfaces of various kinds.

Given an edge (e.g. the edge of a polygon) defined by the vertices $V_1$ and $V_2$ in camera space, the length of the edge's projection in render pixel space may be computed according to the relation $\|v_2-v_1\|$, where $v_1$ and $v_2$ are the projections of $V_1$ and $V_2$ respectively into render pixel space, where $\|*\|$ denotes a vector norm such as the $L^1$ norm, the $L^\infty$ norm, or Euclidean norm, or, an approximation to a vector norm. The $L^1$ norm of a vector is the sum of the absolute values of the vector components. The $L^\infty$ norm of a vector is the maximum of the absolute values of the vector components. The Euclidean norm of a vector is the square root of the sum of the squares of the vector components.

In some implementations, primitives may be tessellated into "microquads", i.e., micropolygons with at most four edges. In other implementations, primitives may be tessellated into microtriangles, i.e., micropolygons with exactly three edges. More generally, for any integer $N_s$ greater than or equal to three, a hardware system may be implemented to subdivide primitives into micropolygons with at most $N_s$ sides.

Figure 6:
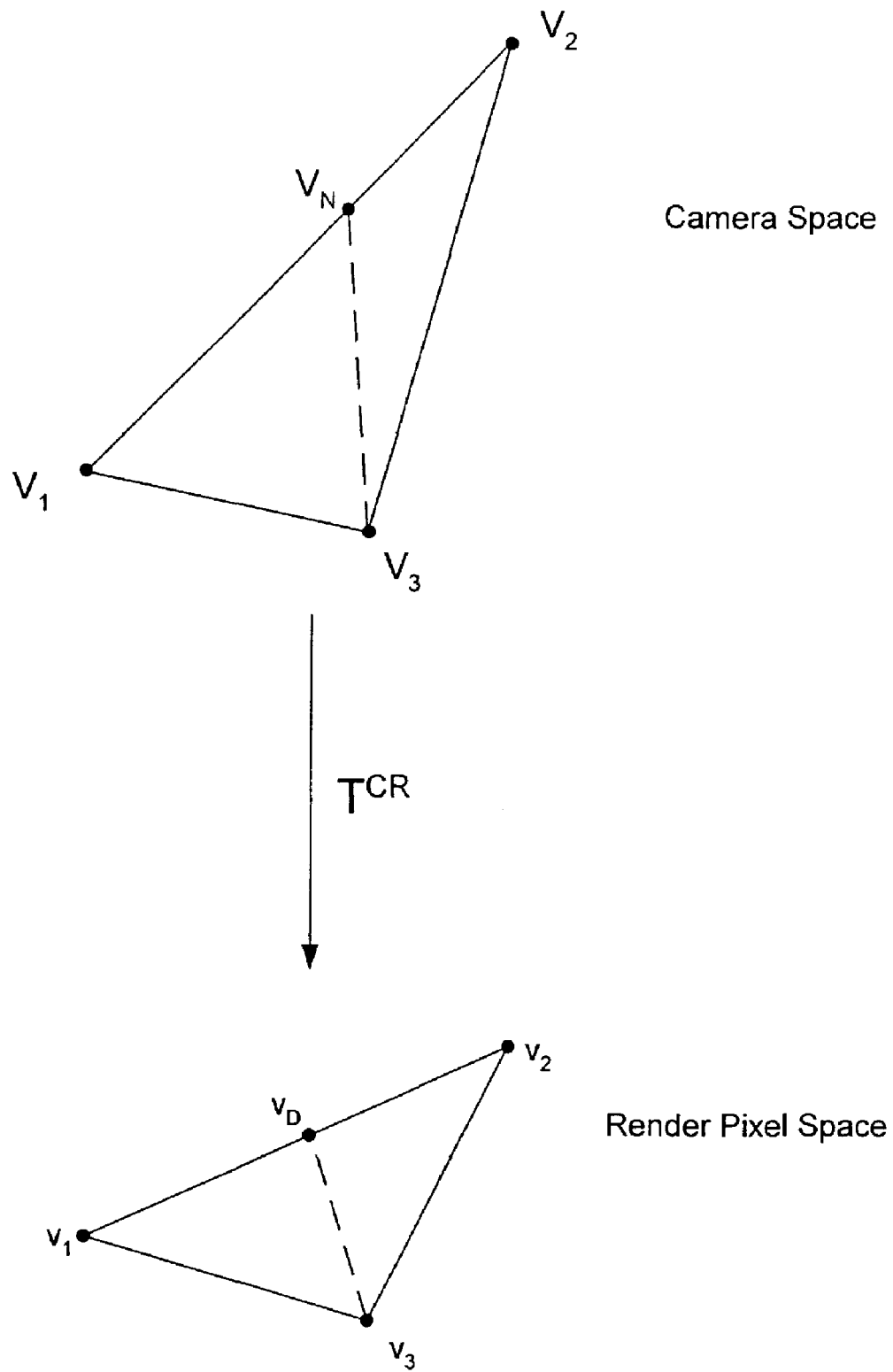
FIG. 6 illustrates a triangle in camera space and its projection into render pixel space.

The tessellation process may involve computations both in camera space and render pixel space as suggested by FIG. 6. A triangle in camera space defined by the vertices $V_1$, $V_2$ and $V_3$ projects onto a triangle in render pixel space defined by the vertices $v_1$, $v_2$ and $V_3$ respectively, i.e., $v_k=T^{CR}V_k$ for k=1, 2, 3. If a new vertex $V_N$ is injected along the edge from $V_1$ to $V_2$, two new subtriangles, having as their common edge the line segment from $V_N$ to $V_3$, may be generated.

Because the goal of the tessellation process is to arrive at component pieces which are sufficiently small as seen in render pixel space, the tessellation process may initially specify a scalar value $\sigma^R$ which defines a desired location $v_D$ along the screen space edge from v1 to v2 according to the relation $v_D=(1-\sigma^R)*v_1+\sigma^R*v_2$. (For example, one of the fragmentation processes may aim at dividing the screen space edge from v1 to v2 at its midpoint. Thus, such a fragmentation process may specify the value $\sigma^R=0.5$.) Instead of computing $v_D$ directly and then applying the inverse mapping $(T^{CR})^-$ to determine the corresponding camera space point, the scalar value $\sigma^R$ may then be used to compute a scalar value $\sigma^C$ with the property that the projection of the camera space position $$V_N = (1-\sigma^C)*V_1 + \sigma^C*V_2$$

into render pixel space equals (or closely approximates) the screen space point $v_D$. The scalar value $\sigma^C$ may be computed according to the formula:

$$\sigma^C = \left(\frac{1}{W_2 - W_1}\right)\left(\frac{1}{\frac{1}{W_1} + \sigma^R \cdot \left(\frac{1}{W_2} - \frac{1}{W_1}\right)} - W_1\right),$$

where $W_1$ and $W_2$ are the W coordinates of camera space vertices $V_1$ and $V_2$ respectively. The scalar value $\sigma^C$ may then be used to compute the camera space position $V_N=(1-\sigma^C)*V_1+\sigma^C*V_2$ for the new vertex. Note that $\sigma^C$ is not generally equal to $\sigma^R$ since the mapping $T^{CR}$ is generally not linear. (The vertices $V_1$ and $V_2$ may have different values for the W coordinate.)

As illustrated above, tessellation includes the injection of new vertices along the edges of primitives and in the interior of primitives. Data components (such as color, surface normal, texture coordinates, texture coordinate derivatives, transparency, etc.) for new vertices injected along an edge may be interpolated from the corresponding data components associated with the edge endpoints. Data components for new vertices injecting in the interior of a primitive may be interpolated from the corresponding data components associated with the vertices of the primitive.

In step 122, a programmable displacement shader (or a set of programmable displacement shaders) may operate on the vertices of the micropolygons. A user may program the processing algorithm(s) implemented by the displacement shader(s). The displacement shader(s) move the vertices in camera space. Thus, the micropolygons may be perturbed into polygons that no longer qualify as micropolygons (because their size as viewed in render pixel space has increased beyond the maximum size constraint). For example, the vertices of a microtriangle which is facing almost "on edge" to the virtual camera may be displaced in camera space so that the resulting triangle has a significantly larger projected area or diameter in render pixel space. Therefore, the polygons resulting from the displacement shading may be fed back to step 120 for tessellation into micropolygons. The new micropolygons generated by tessellation step 120 may be forwarded to step 122 for another wave of displacement shading or to step 125 for surface shading and light shading.

In step 125, a set of programmable surface shaders and/or programmable light source shaders may operate on the vertices of the micropolygons. The processing algorithm performed by each of the surface shaders and light source shaders may be programmed by a user. After any desired programmable surface shading and lighting have been performed on the vertices of the micropolygons, the micropolygons may be forwarded to step 130.

Figure 7:
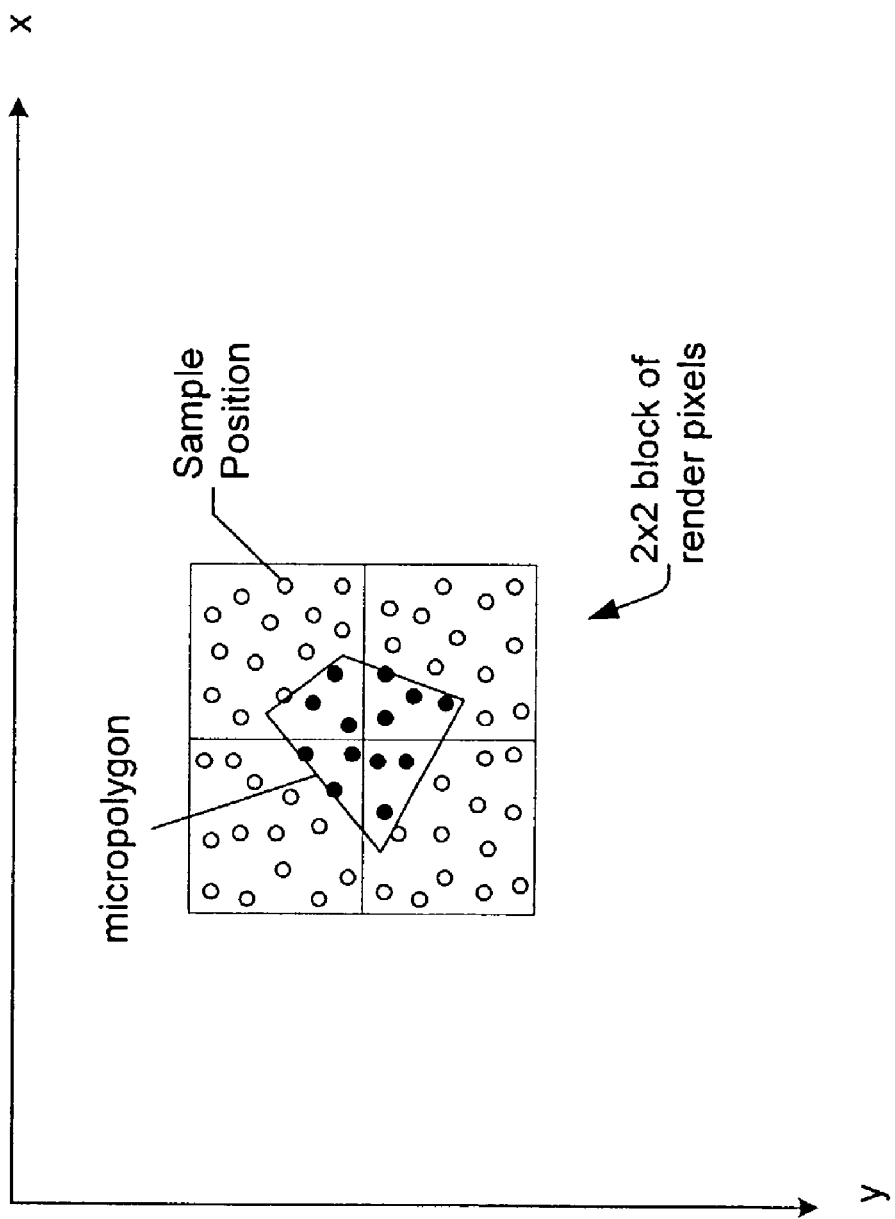
FIG. 7 illustrates a process for filling a micropolygon with samples.

In step 130, a sample fill operation is performed on the micropolygons as suggested by FIG. 7. A sample generator may generate a set of sample positions for each render pixel that has a nonempty intersection with the micropolygon. The sample positions that reside interior to the micropolygon may be identified as such. A sample may then be assigned to each interior sample position in the micropolygon. The contents of a sample may be user defined. Typically, the sample includes a color vector (e.g., an RGB vector) and a depth value (e.g., a z value or a 1/W value).

The algorithm for assigning samples to the interior sample positions may vary from one hardware implementation to the next. For example, according to a "flat fill" algorithm, each interior sample position of the micropolygon may be assigned the color vector and depth value of a selected one of the micropolygon vertices. The selected micropolygon vertex may be the vertex which has the smallest value for the sum x+y, where x and y are the render pixel space coordinates for the vertex. If two vertices have the same value for x+y, then the vertex that has the smaller y coordinate, or alternatively, x coordinate, may be selected. Alternatively, each interior sample position of the micropolygon may be assigned the color vector and depth value of the closest vertex of the micropolygon vertices.

According to an "interpolated fill" algorithm, the color vector and depth value assigned to an interior sample position may be interpolated from the color vectors and depth values already assigned to the vertices of the micropolygon.

According to a "flat color and interpolated z" algorithm, each interior sample position may be assigned a color vector based on the flat fill algorithm and a depth value based on the interpolated fill algorithm.

The samples generated for the interior sample positions are stored into a sample buffer 140. Sample buffer 140 may store samples in a double-buffered fashion (or, more generally, in an multi-buffered fashion where the number N of buffer segments is greater than or equal to two). In step 145, the samples are read from the sample buffer 140 and filtered to generate video pixels.

Figure 8:
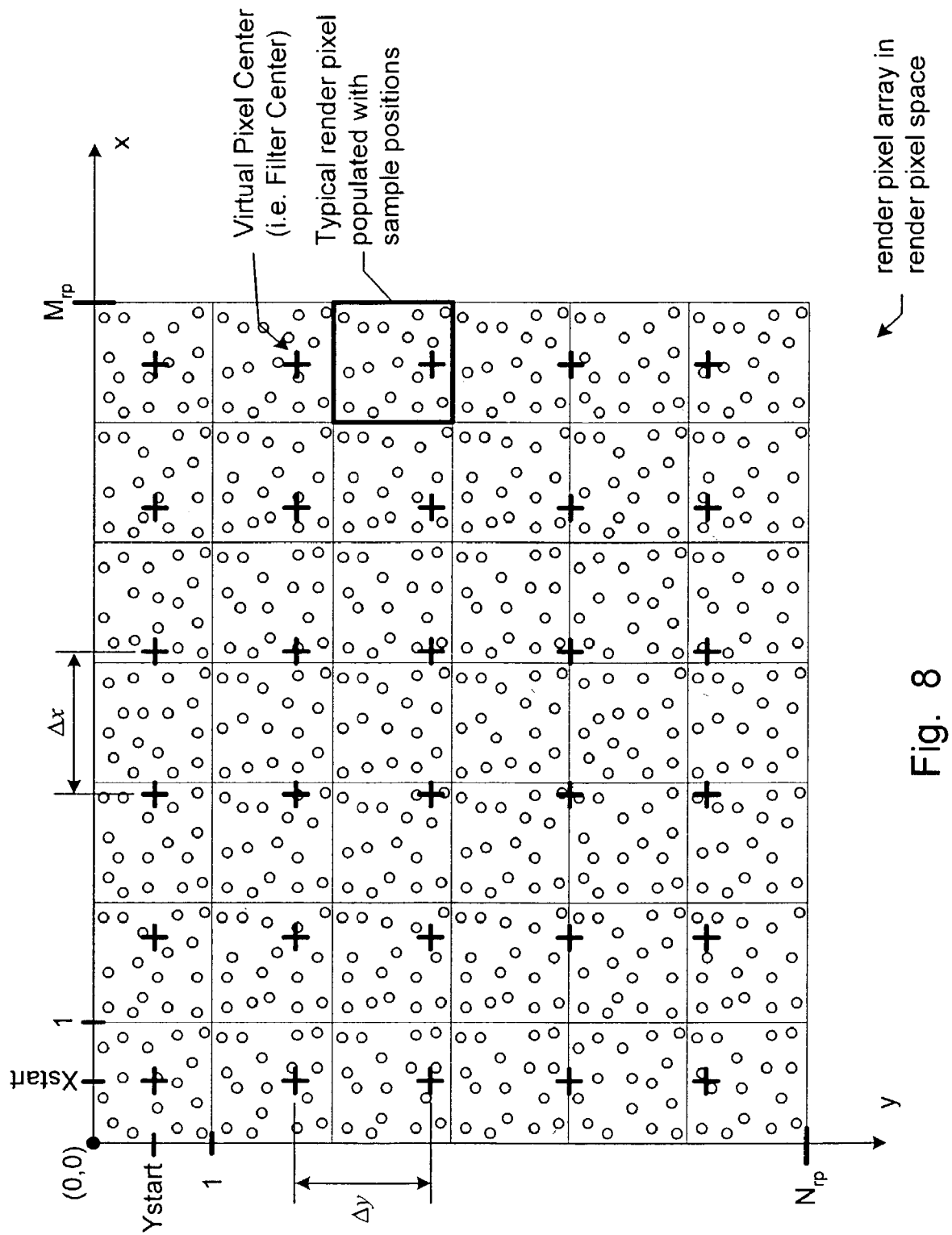
FIG. 8 illustrates an array of virtual pixel positions superimposed on an array of render pixels in render pixel space.

The rendering pipeline 100 may be configured to render primitives for an $M_{rp} \times N_{rp}$ array of render pixels in render pixel space as suggested by FIG. 8. Each render pixel may be populated with $N_{sd}$ sample positions. The values $M_{rp}$, $N_{rp}$ and $N_{sd}$ are user-programmable parameters. The values $M_{rp}$ and $N_{rp}$ may take any of a wide variety of values, especially those characteristic of common video formats.

The sample density $N_{sd}$ may take any of a variety of values, e.g., values in the range from 1 to 16 inclusive. More generally, the sample density $N_{sd}$ may take values in the interval $[1, M_{sd}]$, where $M_{sd}$ is a positive integer. It may be convenient for $M_{sd}$ to equal a power of two such as 16, 32, 64, etc. However, powers of two are not required.

The storage of samples in the sample buffer 140 may be organized according to memory bins. Each memory bin corresponds to one of the render pixels of the render pixel array, and stores the samples corresponding to the sample positions of that render pixel.

The filtering process may scan through render pixel space in raster fashion generating virtual pixel positions denoted by the small plus markers, and generating a video pixel at each of the virtual pixel positions based on the samples (small circles) in the neighborhood of the virtual pixel position. The virtual pixel positions are also referred to herein as filter centers (or kernel centers) since the video pixels are computed by means of a filtering of samples. The virtual pixel positions form an array with horizontal displacement $\Delta X$ between successive virtual pixel positions in a row and vertical displacement $\Delta Y$ between successive rows. The first virtual pixel position in the first row is controlled by a start position $(X_{start}, Y_{start})$. The horizontal displacement $\Delta X$, vertical displacement $\Delta Y$ and the start coordinates $X_{start}$ and $Y_{start}$ are programmable parameters. Thus, the size of the render pixel array may be different from the size of the video pixel array.

Figure 9:
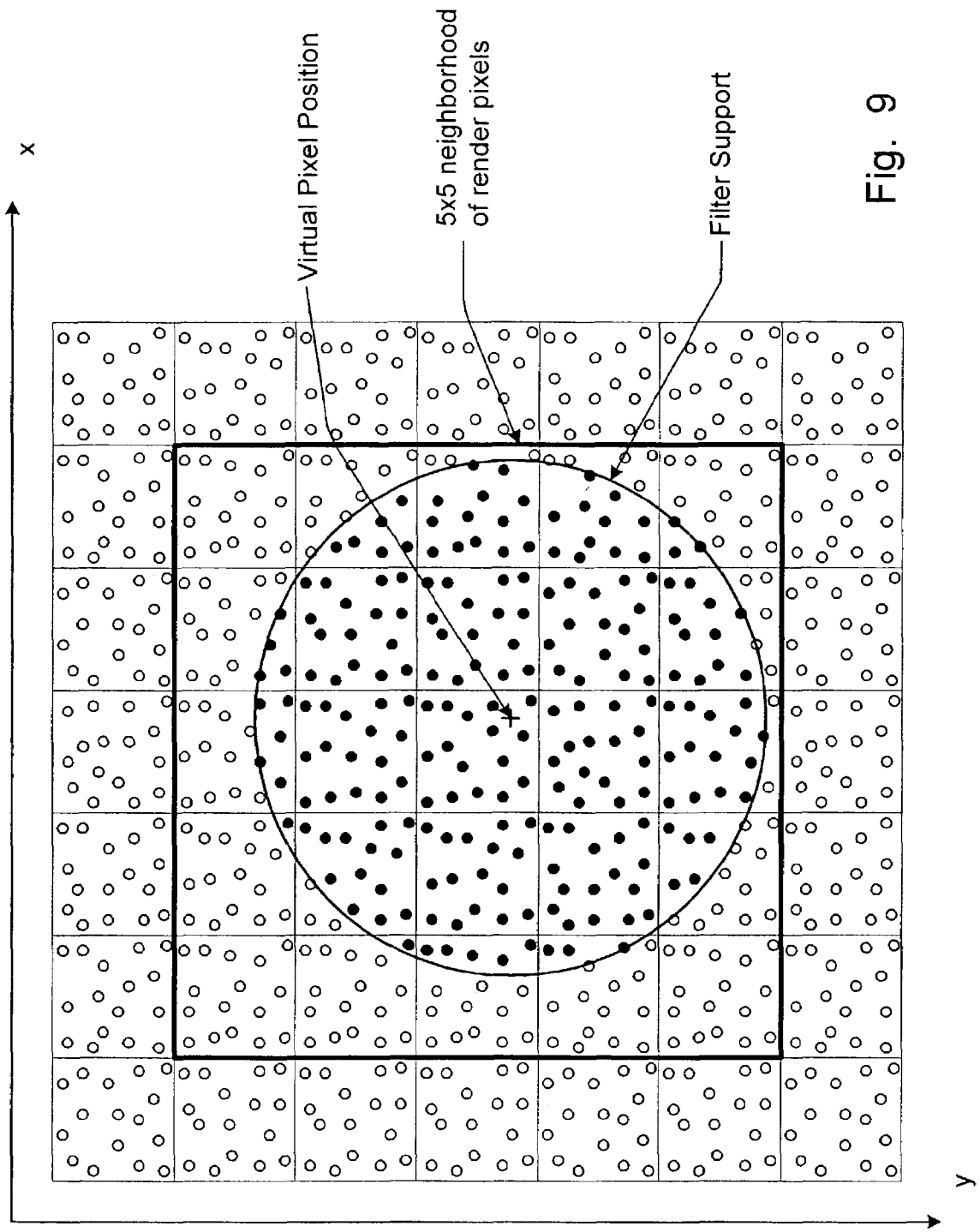
FIG. 9 illustrates the computation of a pixel at a virtual pixel position (denoted by the plus marker) according to one set of embodiments.

The filtering process may compute a video pixel at a particular virtual pixel position as suggested by FIG. 9. The filtering process may compute the video pixel based on a filtration of the samples falling within a support region centered on (or defined by) the virtual pixel position. Each sample S falling within the support region may be assigned a filter coefficient $C_S$ based on the sample's position (or some function of the sample's radial distance) with respect to the virtual pixel position.

Each of the color components of the video pixel may be determined by computing a weighted sum of the corresponding sample color components for the samples falling inside the filter support region. For example, the filtering process may compute an initial red value $r_P$ for the video pixel P according to the expression $$r_P = \Sigma C_S r_S,$$

where the summation ranges over each sample S in the filter support region, and where $r_S$ is the red color component of the sample S. In other words, the filtering process may multiply the red component of each sample S in the filter support region by the corresponding filter coefficient $C_S$, and add up the products. Similar weighted summations may be performed to determine an initial green value $g_P$, an initial blue value $b_P$, and optionally, an initial alpha value $\alpha_P$ for the video pixel P based on the corresponding components of the samples.

Furthermore, the filtering process may compute a normalization value E by adding up the filter coefficients $C_S$ for the samples S in the filter support region, i.e., $$E = \Sigma C_S.$$

The initial pixel values may then be multiplied by the reciprocal of E (or equivalently, divided by E) to determine normalized pixel values:

$$R_P = (1/E) * r_P$$

$$G_P = (1/E) * g_P$$

$$B_P = (1/E) * b_P$$

$$A_P = (1/E) * \alpha_P.$$

The filter coefficient $C_S$ for each sample S in the filter support region may be determined by a table lookup. For example, a radially symmetric filter may be realized by a filter coefficient table, which is addressed by a function of a sample's radial distance with respect to the virtual pixel center. The filter support for a radially symmetric filter may be a circular disk as suggested by the example of FIG. 9. The support of a filter is the region in render pixel space on which the filter is defined. The terms "filter" and "kernel" are used as synonyms herein. Let $R_f$ denote the radius of the circular support disk.

Figure 10:
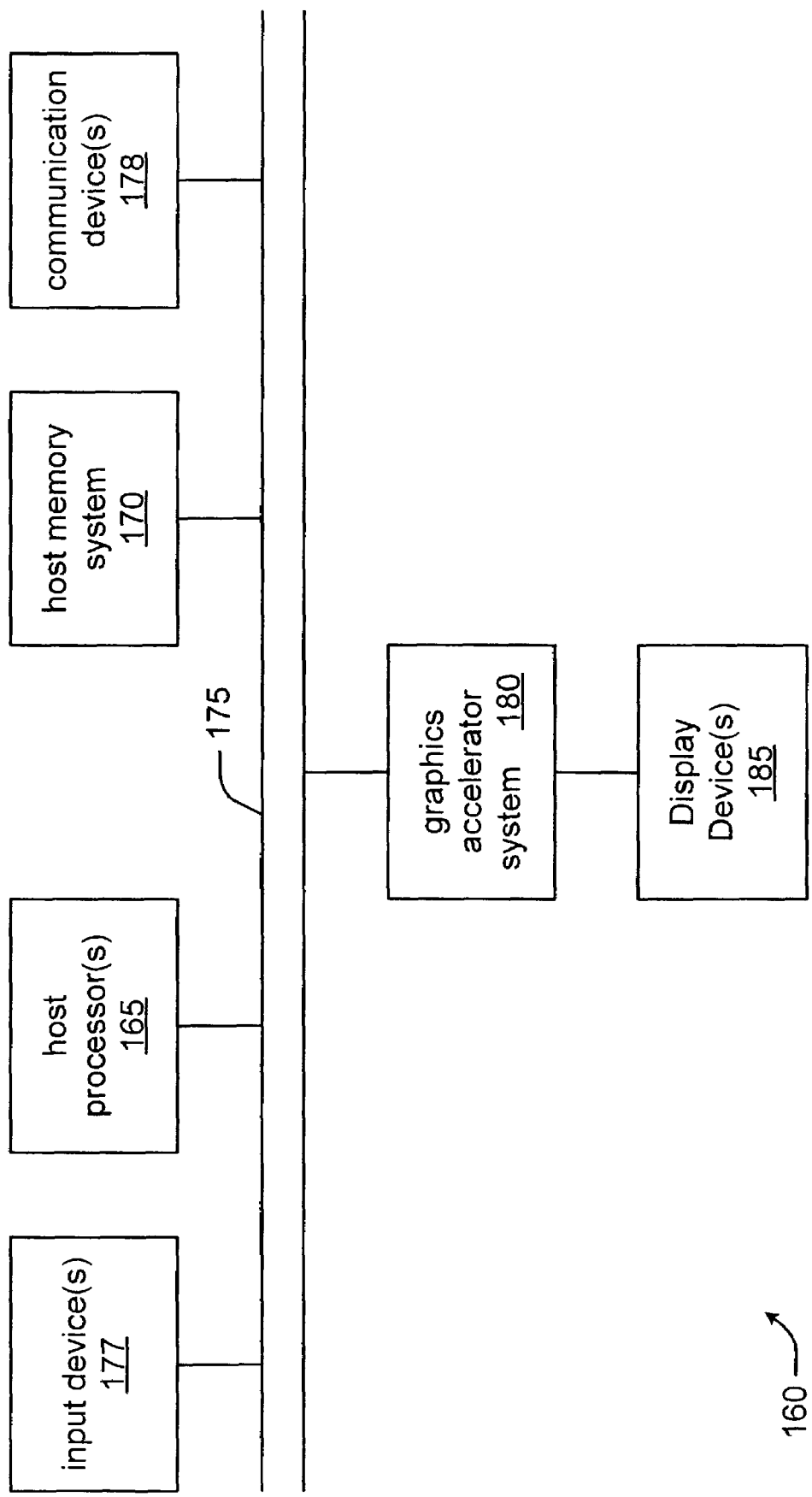
FIG. 10 illustrates one set of embodiments of a computational system configured to perform graphical rendering computations.

FIG. 10 illustrates one set of embodiments of a computational system 160 operable to perform graphics rendering computations. Computational system 160 includes a set of one or more host processors 165, a host memory system 170, a set of one or more input devices 177, a graphics accelerator system 180 (also referred to herein as a graphics accelerator), and a set of one or more display devices 185. Host processor(s) 165 may couple to the host memory system 170 and graphics system 180 through a communication medium such as communication bus 175, or perhaps, through a computer network.

Host memory system 170 may include any desired set of memory devices, e.g., devices such as semiconductor RAM and/or ROM, CD-ROM drives, magnetic disk drives, magnetic tape drives, bubble memory, etc. Input device(s) 177 include any of a variety of devices for supplying user input, i.e., devices such as a keyboard, mouse, track ball, head position and/or orientation sensors, eye orientation sensors, data glove, light pen, joystick, game control console, etc. Computational system 160 may also include a set of one or more communication devices 178. For example, communication device(s) 178 may include a network interface card for communication with a computer network.

Graphics system 180 may be configured to implement the graphics computations associated with rendering pipeline 100. Graphics system 180 generates a set of one or more video signals (and/or digital video streams) in response to graphics data received from the host processor(s) 165 and/or the host memory system 170. The video signals (and/or digital video streams) are supplied as outputs for the display device(s) 185.

In one embodiment, the host processor(s) 165 and host memory system 170 may reside on the motherboard of a personal computer (or personal workstation). Graphics system 180 may be configured for coupling to the motherboard.

Figure 11:
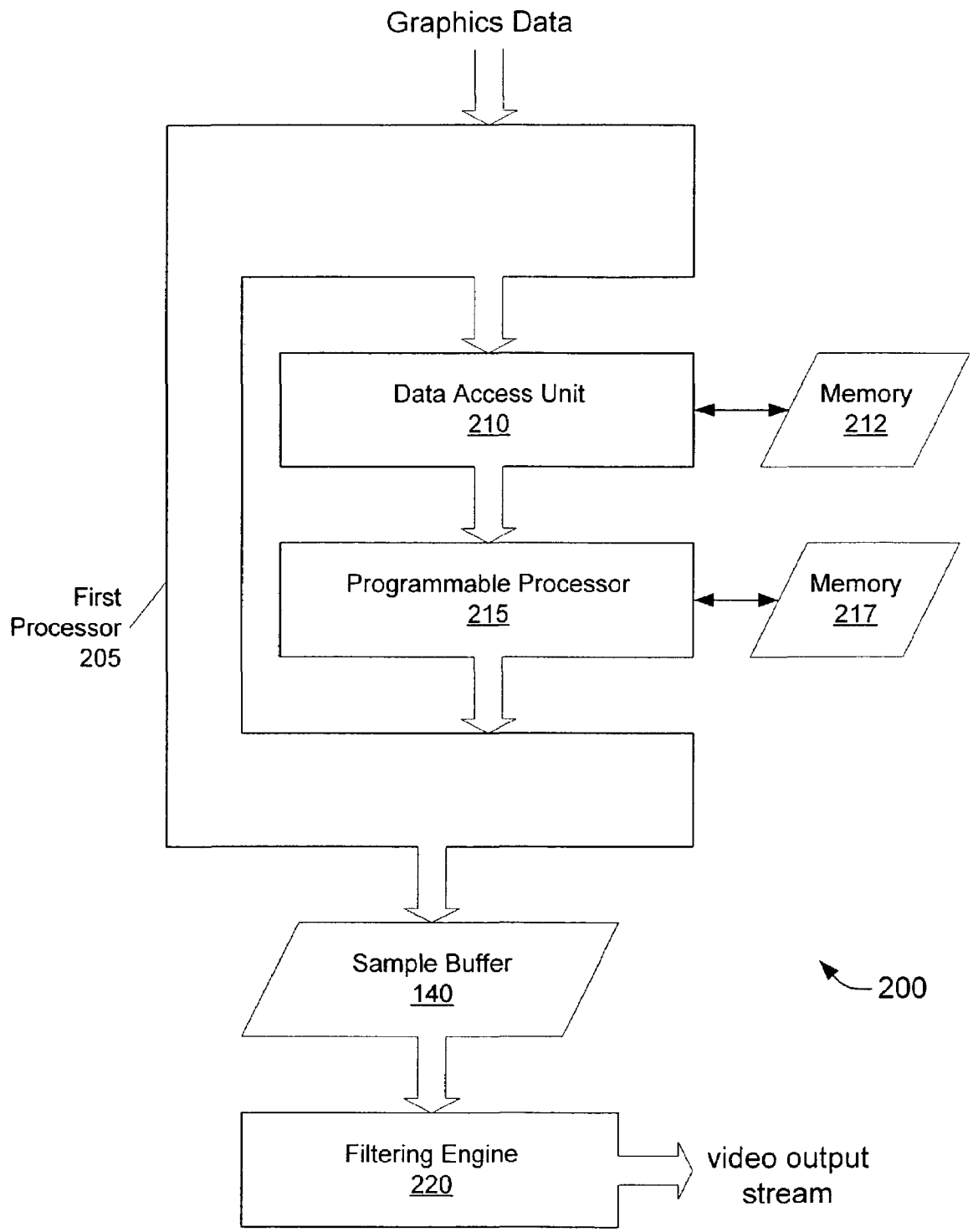
FIG. 11 illustrates one embodiment of a graphics system configured to perform per pixel programmable shading.

The rendering pipeline 100 may be implemented in hardware in a wide variety of ways. For example, FIG. 11 illustrates one embodiment of a graphics system 200 that implements the rendering pipeline 100. Graphics system 200 includes a first processor 205, a data access unit 210, programmable processor 215, sample buffer 140 and filtering engine 220. The first processor 205 may implement steps 110, 112, 115, 120 and 130 of the rendering pipeline 100. Thus, the first processor 205 may receive a stream of graphics data from a graphics processor, pass micropolygons to data access unit 210, receive shaded micropolygons from the programmable processor 215, and transfer samples to sample buffer 140. In one set of embodiments, graphics system 200 may serve as graphics accelerator system 180 in computational system 160.

The programmable processor 215 implements steps 122 and 125, i.e., performs programmable displacement shading, programmable surface shading and programmable light source shading. The programmable shaders may be stored in memory 217. A host computer (coupled to the graphics system 200) may download the programmable shaders to memory 217. Memory 217 may also store data structures and/or parameters that are used and/or accessed by the programmable shaders. The programmable processor 215 may include one or more microprocessor units that are configured to execute arbitrary code stored in memory 217.

Data access unit 210 may be optimized to access data values from memory 212 and to perform filtering operations (such as linear, bilinear, trilinear, cubic or bicubic filtering) on the data values. Memory 212 may be used to store map information such as bump maps, displacement maps, surface texture maps, shadow maps, environment maps, etc. Data access unit 210 may provide filtered and/or unfiltered data values (from memory 212) to programmable processor 215 to support the programmable shading of micropolygon vertices in the programmable processor 215.

Data access unit 210 may include circuitry to perform texture transformations. Data access unit 210 may perform a texture transformation on the texture coordinates associated with a micropolygon vertex. Furthermore, data access unit 210 may include circuitry to estimate a mip map level λ from texture coordinate derivative information. The result of the texture transformation and the mip map level (MML) estimation may be used to compute a set of access addresses in memory 212. Data access unit 210 may read the data values corresponding to the access addresses from memory 212, and filter the data values to determine a filtered value for the micropolygon vertex. The filtered value may be bundled with the micropolygon vertex and forwarded to programmable processor 215. Thus, the programmable shaders may use filtered map information to operate on vertex positions, normals and/or colors, if the user so desires.

Filtering engine 220 implements step 145 of the rendering pipeline 100. In other words, filtering engine 220 reads samples from sample buffer 140 and filters the samples to generate video pixels. The video pixels may be supplied to a video output port in order to drive a display device such as a monitor, a projector or a head-mounted display.

Figure 12:
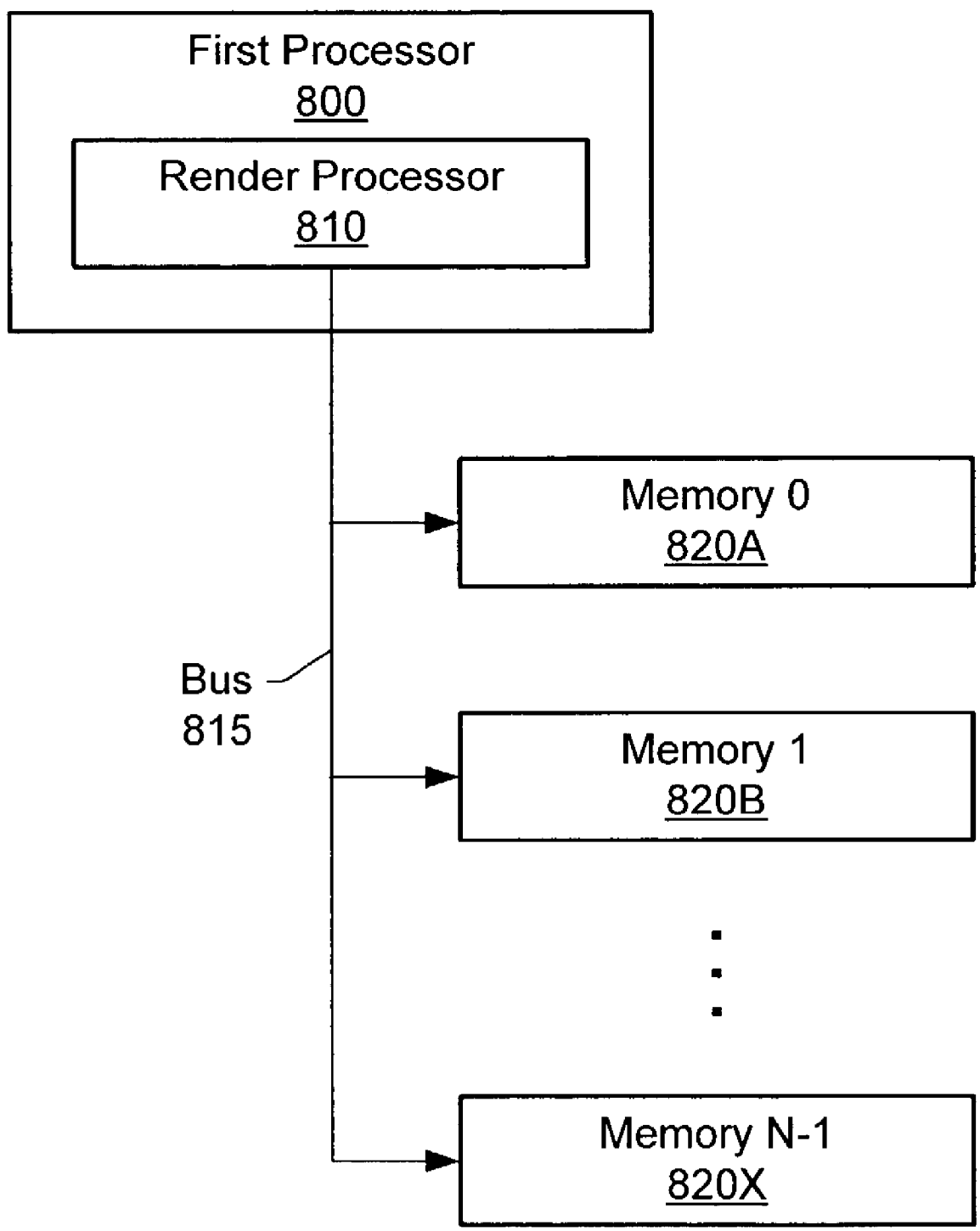
FIG. 12 is a simplified block diagram of one embodiment of a system for rendering and conditionally storing one sample in a plurality of memory locations.
Figure 13:
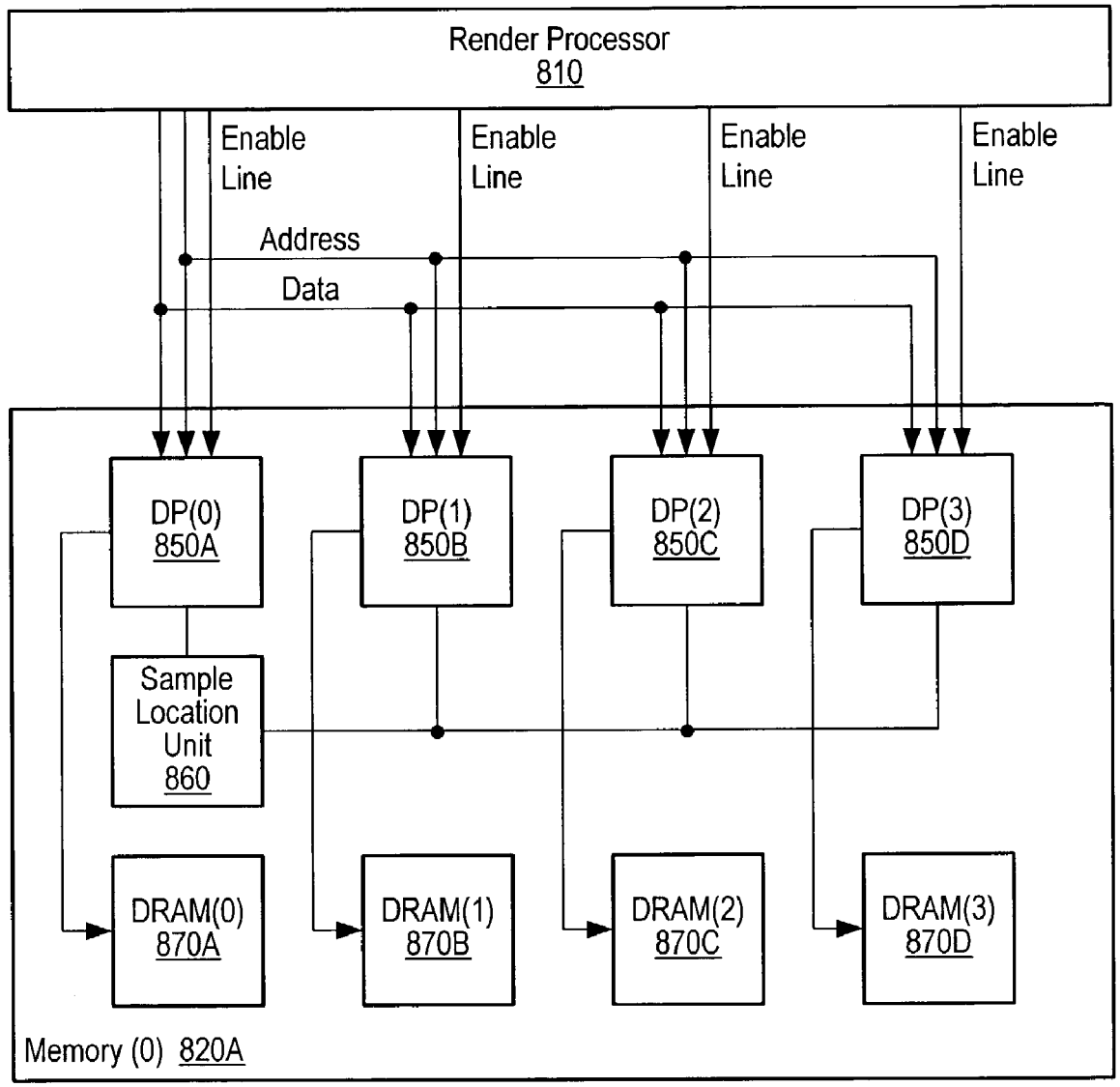
FIG. 13 is a simplified block diagram of one embodiment of a system for rendering and conditionally storing one sample in a plurality of memory locations and a memory configured to calculate depth values for each memory location.
Figure 14:
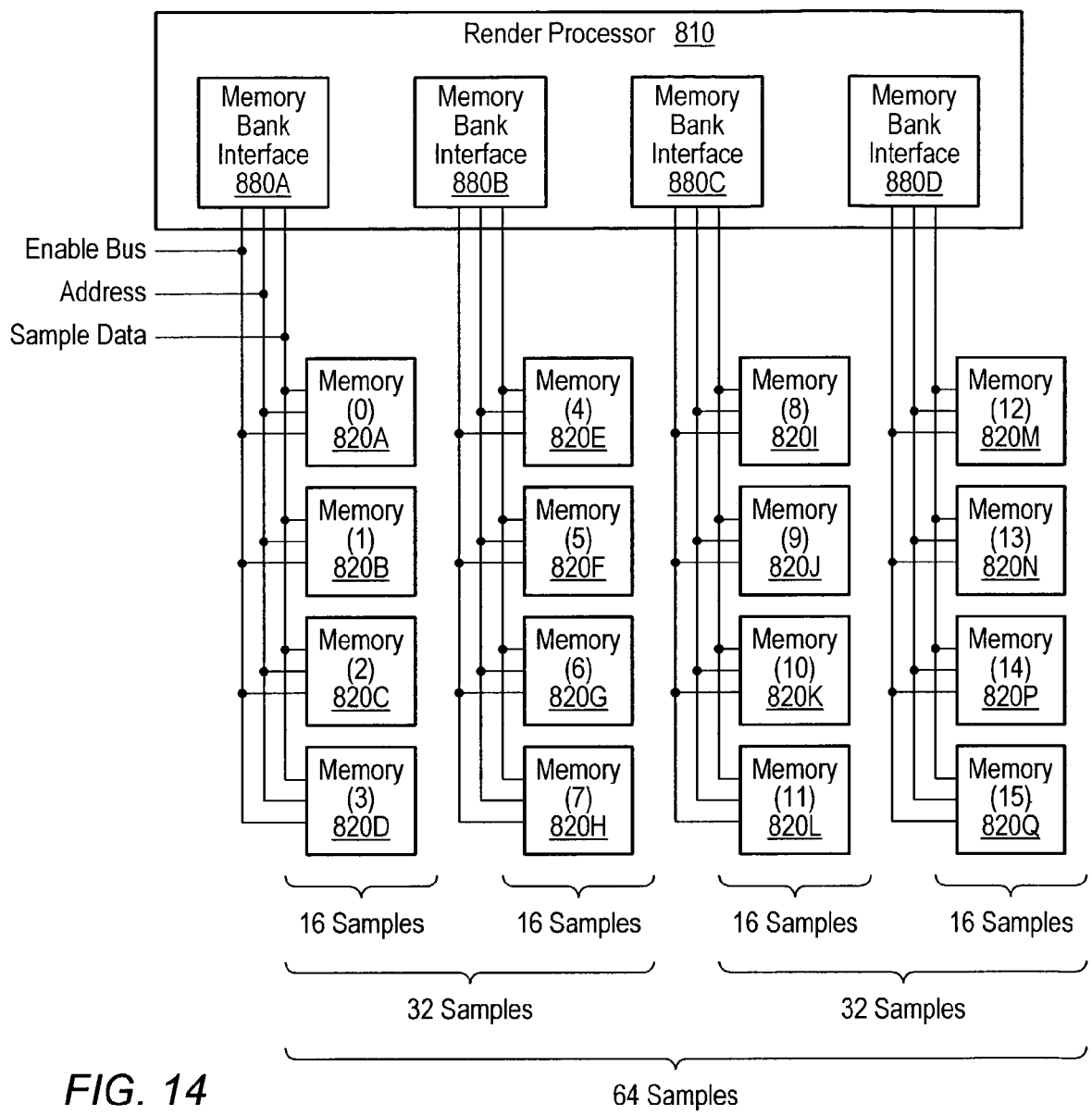
FIG. 14 is a simplified block diagram of one embodiment of a system for rendering and conditionally storing one sample in 64 memory locations.

System for Storage of a Sample to a Plurality of Memory Locations—FIGS. 12,13,&14

FIGS. 12, 13, & 14 describe various embodiments of a system to render parameter values for one sample position and conditionally replace the parameter values in a plurality of memory locations that correspond to neighboring sample positions, while retaining the capability to calculate depth values for sample locations corresponding to each neighboring sample position and conditionally replace the depth values in the corresponding memory locations. This mode of storing is referred to herein as sample grouping mode. Parameter values include, but are not limited to one or more of color values (red, green, and/or blue) and alpha. Conditional replacement of parameter values is dependent on one or more tests that may be performed in processor enhanced memories and may include a Z component comparison, one or more window ID tests, and one or more stencil tests.

In some embodiments, the user may specify sample grouping mode as the storage mode for one or more graphics objects, and the specification may be incorporated with the graphics data for polygons corresponding to the objects. In other embodiments, the storage mode may be set for all processing, for the processing of regions of the image such as the sky, or for processing large objects with insubstantial differences in color. In still other embodiments, the mode may be varied dynamically in response to a need for faster processing of a very complex image to provide continuous real time display or for situations where the complexity of the image changes dramatically in real time.

FIGS. 12 & 13 provide block diagrams of one set of embodiments of a graphics system that may render parameter values for one selected sample (also referred to as a selected sample position) of a plurality of neighboring samples and conditionally store the rendered parameter values in a plurality of memory locations corresponding to the plurality of neighboring samples. The system includes a first processor 800, a render processor 810, a plurality of processor enhanced memories 820A–820X (X refers to the last memory in a set of N memories, with N being a positive integer), and a bus 815 connecting the render processor 810 and the plurality of memories 820A–820X.

In some embodiments, the first processor 800 may receive and/or generate 3-D graphics data corresponding to a graphics object. The 3-D graphics data may include vertex data and instructions to use a sample grouping mode that renders parameter values for one selected sample of a plurality of samples and conditionally stores the rendered values in memory locations corresponding to the plurality of samples.

In some embodiments, sample locations are pre-determined. Sample locations may be stored in an ordered list for a specified region of sample space (such as the region of sample space corresponding to a render pixel). The sequence position of a sample in an ordered list of the samples in the specified region of sample space may be used to select a corresponding sample location from a pre-selected ordered list of sample locations for the specified region of sample space. Pre-selected sample locations may be specified by a look-up table, a look-up table tiled a sufficient number of times to span sample space, a specified set of permutations of a look-up table that span sample space, a specified grid, or a jitter table. Other specifications are possible and contemplated.

The plurality of processor enhanced memories 820A–X (FIG. 14) may include means for regenerating a sample location corresponding to a sample and a depth value for each sample location determined. The means for determining sample locations may include one or more sample location units 860 and one or more data processors 850A–D (DP(i), as shown in FIG. 13). The data processors 850A–D may be configured to retrieve a sample location corresponding to a sample from the sample location unit 860 and determine a depth value for the sample location using a depth value for the selected sample and the rates of change of depth (provided by the rendering unit) for neighboring sample locations.

The parameter values rendered for a selected sample position may be conditionally stored in a plurality of processor enhanced memories 820A–X with one data transfer transaction. In some embodiments, a memory may be subdivided into a plurality of sections such as DRAM 870A–D as illustrated in FIG. 13. (DRAM is an acronym for dynamic random access memory.) In other embodiments, a plurality of memory units may be addressed to conditionally store parameter values to 16, 32, or 64 memory locations as illustrated in FIG. 14 (for N=16).

In some embodiments, sample buffer 140 may be realized by memories 820A–X as illustrated in FIG. 12 (or, more particularly, in FIG. 14). The memories may be organized into $N_1$ banks. A memory bank may include $N_2$ memories that may share a common address bus and data bus. However, each memory in a bank may have its own data capture enable line. Thus, any subset of the memories of a bank may be conditionally updated in a single transaction by appropriate control of the enable lines. $N_1$ and $N_2$ are positive integers.

FIG. 14 illustrates the case $N_1=N_2=4$. Memory bank interface 880A couples to a first memory bank including memories 820A–D through an address bus, a sample data bus and an enable bus. The enable bus may include one data capture enable line for each of the memories of the first bank. Each of memory bank interfaces 880B–D may couple to a corresponding bank of memories in a similar fashion.

Memory bank interfaces 880A–D may operate in parallel. In other words, the memory bank interfaces 880A–D may perform conditional store transactions in parallel with one another. Therefore, in a single data transfer cycle, any subset of the memories 820A–X may be updated with sample data.

In one embodiment, each of the memories 820A–X may include $N_3$ memory sections (e.g., DRAM memory sections). Each memory section may have its own enable line. Thus, the data capture enable bus for a memory bank may include $N_2*N_3$ enable lines. Thus, each memory interface may update any subset of the $N_2*N_3$ memory sections of the corresponding memory bank in a single conditional store transaction. $N_3$ is a positive integer.

The render processor 810 may be configured to generate a data capture code. The code may specify which memory locations will be selected and each memory or memory section may be configured to read the code and conditionally store the parameter values in the selected memory locations.

The render processor 810 may also include a data compressor unit configured to compress depth value data for each of the samples in the group of neighboring samples, and the data processors 850 in the memories 820 may also include a data de-compressor unit configured to receive the compressed data, de-compress the data, and output a depth value for each of the samples in the group of neighboring samples.

In some embodiments, additional components may be connected to the system (as shown in FIG. 10) including one or more display devices 185, one or more input devices 177, one or more communication devices 178, and/or a host processor 165. The display devices 185 may include any of various types of display monitors or display devices (e.g., a CRT, LCD, or gas-plasma display). Various input devices 177 may be connected to the system, including a keyboard, mouse, trackball, digitizer, tablet, six-degree of freedom input device, head tracker, eye tracker, data glove, body sensors, and/or other input device.

Figure 15:
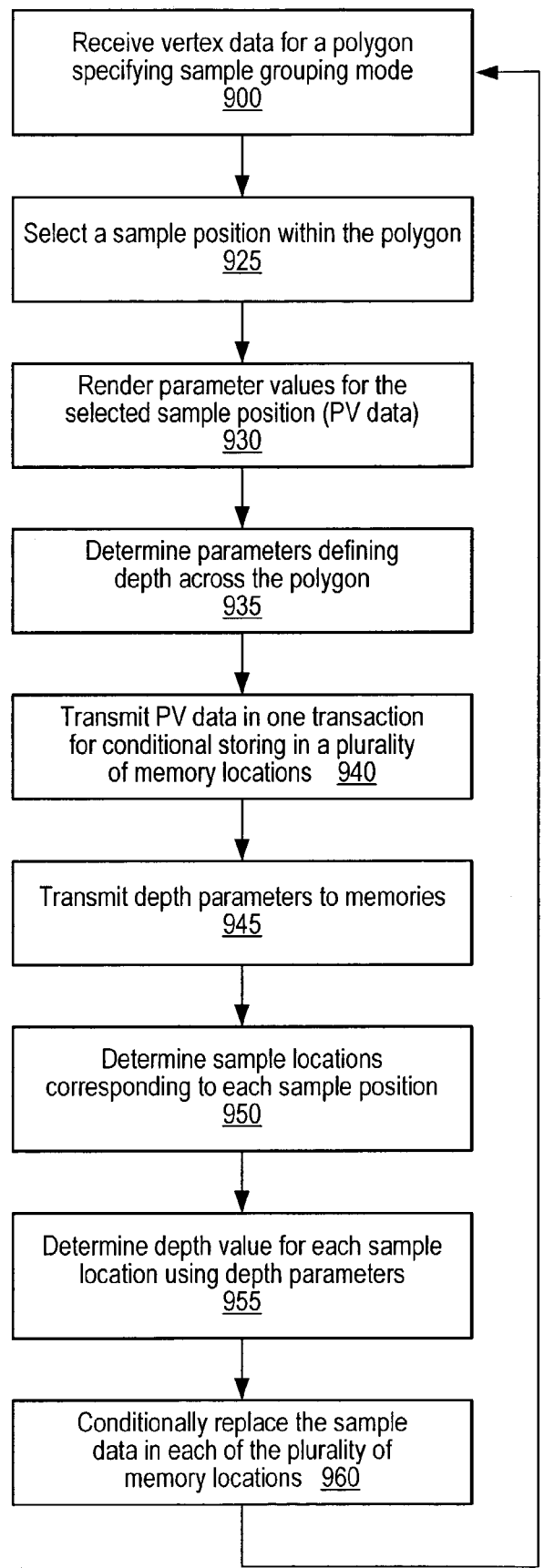
FIG. 15 is a flowchart of one embodiment of a method for rendering and conditionally storing a sample rendered for one sample position in a plurality of memory locations.

Method for Storage of a Sample to a Plurality of Memory Locations—FIG. 15

FIG. 15 describes a set of embodiments of a method to render and conditionally replace parameter values for one selected sample position in a plurality of memory locations that correspond to a group of neighboring sample positions, while retaining the capability to calculate depth values for locations corresponding to each neighboring sample position and conditionally replace the depth values in the corresponding memory locations. This mode of storing is referred to herein as sample grouping mode. Parameter values include, but are not limited to one or more of color values (red, green, and/or blue) and alpha. Conditional replacement of parameter values is dependent on one or more tests that may be performed in processor enhanced memories and may include a Z component comparison, one or more window ID tests, and one or more stencil tests.

In some embodiments, the user may specify sample grouping mode and the number of sample positions $N_{bm}$ included in the group of neighboring sample positions. The first processor or graphics processor 800 may incorporate the specified mode with the graphics data for a polygon. $N_{bm}$ (the number of sample positions included in the group of neighboring sample positions) may be less than the number of samples per pixel, equal to the number of samples per pixel, or greater than the number of samples per pixel. $N_{bm}$ is a positive integer greater than 1.

In other embodiments, the sample grouping mode may be set for all processing, for the processing of regions of the image such as the sky, or for processing large objects with insubstantial differences in color. In still other embodiments, the mode may be varied dynamically in response to a need for a continued real time display of a very complex image or for situations where the complexity of the image changes dramatically in real time.

FIG. 15 describes a set of embodiments of a method for storage of a rendered sample to a plurality of memory locations. The method may include:

(a) receiving vertex data for a polygon (also referred to as a micropolygon or a trimmed render pixel) that includes the specification of sample grouping mode (or having sample grouping mode independently specified) (step 900), (b) selecting a sample position within the polygon (step 925), (c) rendering parameter values for the selected sample position using the vertex data (step 930), (d) determining parameters defining depth across the polygon (step 935), (e) transmitting the parameter values for conditional storing in the plurality of memory locations that correspond to the plurality of neighboring sample positions in one transaction (step 940), (f) transmitting the depth parameters to the plurality of memories (step 945), (g) determining sample locations corresponding to each of the neighboring sample positions (step 950), (h) determining depth values for each sample location using the depth parameters (step 955), and (i) conditionally replacing the parameter values and depth value for each location of the plurality of memory locations corresponding to each of the neighboring sample positions (step 960).

In some embodiments, each memory location has the same address in a plurality of separate processor enhanced memories attached to one data bus and each of the memories may be capable of reading a data capture code. In these embodiments, a single transaction may initiate the conditional storing of parameter values for one selected sample in a plurality of memory locations.

In one set of embodiments, depth values may be determined by the render processor 810, compressed in a data compressor unit and sent to the data processors 850 in the memories 820. A data de-compressor unit in the data processors 850 may de-compress the depth values.

Figure 16:
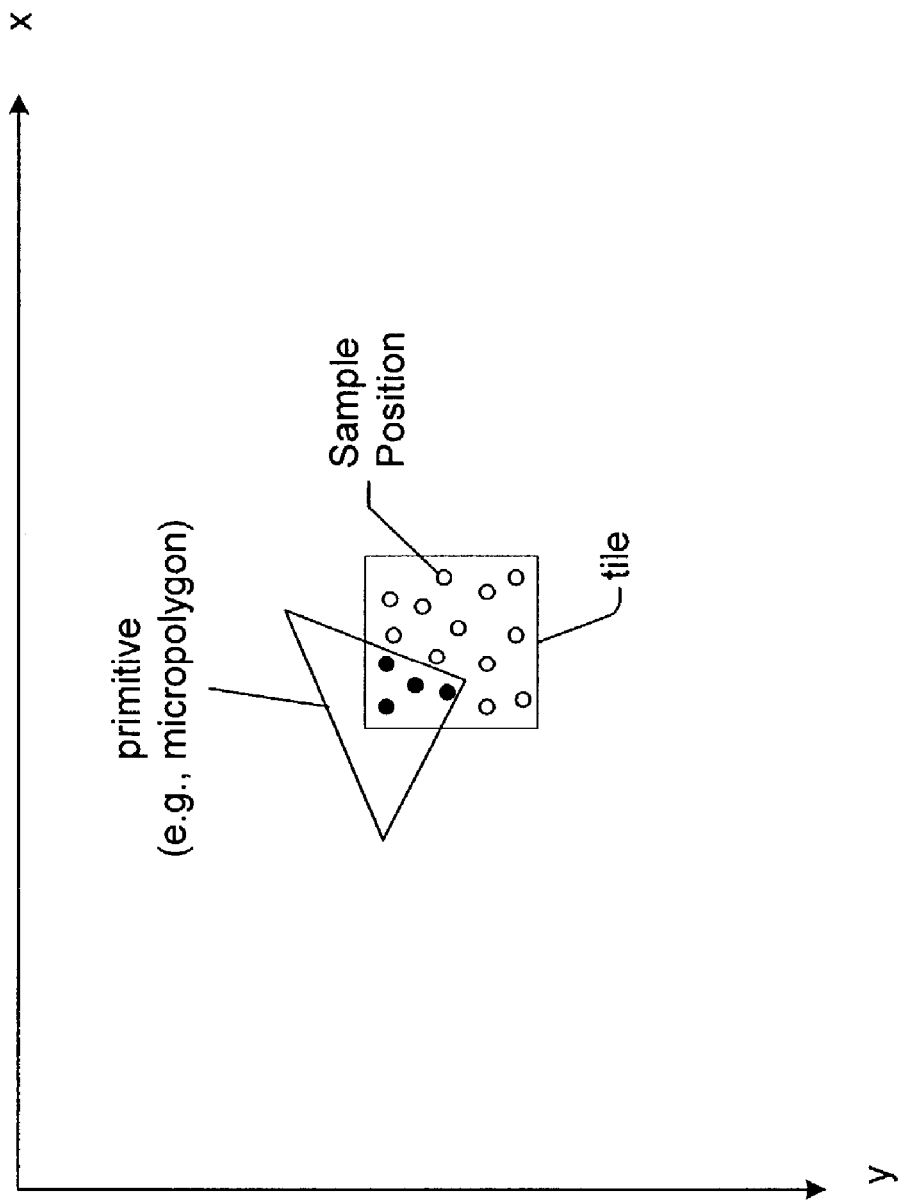
FIG. 16 depicts a neighboring group of 4 samples that may use the sample grouping mode.

In another set of embodiments, render pixel space may be conceived of as being covered by an array of tiles. First processor 800 may generate a group of neighboring sample positions within each tile that geometrically intersects a primitive (e.g., a micropolygon) as suggested by FIG. 16. The number $N_G$ of sample positions in the tile may be a programmable parameter. $N_G$ is a positive integer.

In one embodiment, each tile may correspond to a render pixel. In this case, the value $N_G$ may equal the sample density $N_{sd}$. In another embodiment, each tile may correspond to a 2×2 block of render pixels as suggested by FIG. 7. In this case, the value $N_G$ may equal $4*N_{sd}$.

Sample buffer 140 conditionally stores the $N_G$ samples corresponding respectively to the $N_G$ sample positions in each tile group. Each of the $N_G$ samples of a tile group may be stored in a separate one of the memories 820A–X (or a separate one of the memory sections of the memories 820A–X). Furthermore, each of the $N_G$ samples of a tile group may have the same address in a separate one of the memories (or memory sections). Thus, any subset of the $N_G$ samples may be conditionally updated in a single transaction by appropriate control of the data capture enable lines.

Render processor 810 may determine which of the sample positions of a tile group reside interior to the primitive. Interior sample positions are denoted in FIG. 16 as black dots, while exterior sample positions are denoted as small circles. The four solid samples are candidates for sample grouping mode.

Render processor 810 may determine parameter values (e.g., red, green, blue and transparency) and a depth value for a selected one of the interior sample positions, and command one or more of the memory interfaces 820A–D to transmit the parameter values and depth value of the selected sample position to the subset of memories (or memory sections) that correspond to the interior sample positions. In one embodiment, Render processor 810 sends data capture codes to the respective memory bank interfaces 880A–D along with the parameter values and the depth value of the selected sample position. The data capture code specifies which of the memories (or memory sections) in a corresponding bank are to receive the parameter values and the depth value. In response to receiving the data capture code, a memory interface may initiate a conditional store transaction which may result in the transfer of the parameter values and depth value of the selected sample position to the memory locations specified by the data capture code.

Each memory (or memory section) targeted by the transaction receives the parameter values and depth value of the selected sample position, and conditionally stores the parameter values in the memory location defined by the address asserted on the address bus during the transaction. Furthermore, each memory (or memory section) targeted by the transaction may interpolate a depth value $DV_K$ for the sample position $(X_K, Y_K)$ that it represents in the tile group according to the relation:

$$DV_K = \Delta X * R_1 + \Delta Y * R_2 + DV_{SEL},$$

where $DV_{SEL}$ is the depth value of the selected sample position, $R_1$ and $R_2$ are the rates of change of depth of the primitive with respect to the horizontal and vertical directions of render pixel space, and $(\Delta X, \Delta Y)$ is the displacement between the selected sample position $(X_{SEL}, Y_{SEL})$ and the sample position $(X_K, Y_K)$. The values $\Delta X$ and $\Delta Y$ may be generated by the sample location unit 860 in each memory. The interpolation computation may be performed in the data processors of the memories. (See FIG. 13). Other interpolation schemes are contemplated. The example above is not meant to be limiting.

After computing the depth value $DV_K$ appropriate for the sample position $(X_K, Y_K)$, a memory (or memory section) may conditionally update the memory location defined by the transaction address. Thus, the defined memory location will contain parameter values corresponding to the selected sample position and the interpolated depth $DV_K$ corresponding to the sample position $(X_K, Y_K)$.

It is noted that the sample group mode of storing sample data described herein may be implemented in graphics systems having any of a variety of architectures. For example, please refer to U.S. patent application Ser. No. 10/094,935, filed on Mar. 11, 2002, entitled "Graphics System With A Buddy/Quad Mode For Faster Writes", invented by Michael F. Deering, for the description of an alternative graphics system architecture in which sample replication may be implemented. This patent application (Ser. No. 10/094,935) is hereby incorporated by reference in its entirety as though fully and completely set forth herein.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A method for rendering three-dimensional graphics vertex data, the method comprising:
   rendering one or more parameter values for a selected sample position within a polygon using vertex data corresponding to the polygon, wherein the selected sample position is one sample position of a group of two or more neighboring sample positions within the polygon;
   transmitting in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations corresponds to a different one of the group of two or more neighboring sample positions;
   rendering a depth value individually for each sample position in the group; and
   transmitting the depth value determined for each sample position to the corresponding processor enhanced memory.

2. The method of claim 1, further comprising, for each sample position in the group of two or more neighboring sample positions:
   reading the sample data previously stored in a memory location corresponding to the sample position; and
   conditionally replacing in response to one or more tests, the previously stored sample data with the new rendered parameter values and the new rendered depth value, or a function of the new rendered parameter values and the previously stored parameter values for a transparent sample, wherein said tests comprise one or more of a Z component comparison, one or more window ID tests, and one or more stencil tests.

3. The method of claim 2, wherein said function is programmable.

4. The method of claim 2, further comprising generating pixel values from a corresponding set of stored sample values and outputting the pixel values to a display.

5. The method of claim 1, wherein parameter values for a sample comprise one or more of color values and alpha.

6. The method of claim 1, wherein a location of the selected sample position in sample space is determined from a specified table of sample locations for a corresponding sample space region.

7. The method of claim 1, wherein a location of the selected sample position in sample space is determined from a specified permutation of a specified table of sample locations for a corresponding sample space region.

8. The method of claim 1, wherein a location of the selected sample position in sample space is determined from a specified grid of sample locations for a corresponding sample space region.

9. A method for rendering three-dimensional graphics vertex data, the method comprising:
   rendering one or more parameter values for a selected sample within a polygon of a group of two or more neighboring samples within the polygon, using vertex data corresponding to the polygon;
   transmitting in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations with the same memory address corresponds to a different one of the group of two or more neighboring sample positions;

rendering a depth value individually for each of the two or more neighboring samples within the polygon, using depth value data corresponding to the polygon;

compressing the depth values; and transmitting the compressed depth values to the memories.

10. The method of claim 9, further comprising, for each sample in the group of two or more neighboring samples:

reading the sample data previously stored in a memory location corresponding to the sample;

decompressing the depth value for the sample; and conditionally replacing in response to one or more tests, the previously stored sample data with the new parameter values and the new determined depth value, or a function of the new parameter values and the previously stored parameter values for a transparent sample, wherein said tests comprise a Z component comparison, one or more window ID tests, and one or more stencil tests.

11. The method of claim 10, wherein said function is programmable.

12. The method of claim 10, further comprising generating pixel values from a corresponding set of stored sample values and outputting the pixel values to a display.

13. A method for rendering three-dimensional images, the method comprising:

rendering one or more parameter values for a selected sample position within a polygon using vertex data corresponding to the polygon, wherein the selected sample position is one sample position of a group of two or more neighboring sample positions within the polygon;

transmitting in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations with the same memory address corresponds to a different one of the group of two or more neighboring sample positions;

rendering a depth value individually for each sample position in the group of two or more neighboring sample positions within the polygon;

transmitting the depth values determined for each sample position to the memories;

reading, for each sample position in the group of two or more neighboring sample positions, the sample data previously stored in a memory location corresponding to the sample position; and conditionally replacing in response to one or more tests, the previously stored sample data with the new rendered parameter values and the new determined depth value, wherein said tests comprise one or more of a Z component comparison, one or more window ID tests, and one or more stencil tests.

14. The method of claim 13, wherein each memory location has the same address in a plurality of separate memories, and wherein the plurality of separate memories is attached to a data bus.

15. The method of claim 13, wherein rendering further comprises sending a data capture code with the parameter values rendered for the selected sample position, wherein the data capture code is used to specify memory locations that are selected to conditionally receive the parameter values rendered for the selected sample position.

16. The method of claim 15, wherein the data capture codes are used by the memories to determine for which memory locations the memory will capture the parameter values rendered for the selected sample position and perform the conditional replacement tests.

17. The method of claim 13, wherein each of the plurality of memory locations is within one of a plurality of allocated sections of one or more memories.

18. The method of claim 13, wherein the plurality of memory locations is designed to receive parameter values for K neighboring sample positions identical to the parameter values rendered for the selected sample position of the K sample positions, wherein K is the number of sample positions within the polygon, the polygon is a portion of a render pixel, and K is a positive integer less than or equal to a number of sample positions in a render pixel.

19. The method of claim 13, wherein the group of sample positions are within one or more neighboring polygons.

20. The method of claim 19, wherein the one or more neighboring polygons are portions of corresponding neighboring render pixels.

21. The method of claim 13, wherein parameter values comprise one or more of color values and alpha.

22. The method of claim 13, further comprising generating pixel values from a corresponding set of stored sample values and outputting the pixel values to a display.

23. The method of claim 13, wherein for a transparent sample that satisfies the one or more tests, previously stored parameter values are replaced with a function of the new rendered parameter values and the previously stored parameter values.

24. A system for rendering three-dimensional graphics vertex data, the system comprising:

means for rendering one or more parameter values for a selected sample position within a polygon using vertex data corresponding to the polygon, wherein the selected sample position is one sample position of a group of two or more neighboring sample positions within the polygon;

means for transmitting in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations with the same memory address corresponds to a different one of the group of two or more neighboring sample positions;

means for rendering a depth value individually for each sample position in the group of two or more neighboring sample positions within the polygon; and means for transmitting the depth values determined for each sample position to the memories.

25. A system for rendering three-dimensional graphics vertex data, the system comprising:

means for rendering one or more parameter values for a selected sample within a polygon of a group of two or more neighboring samples within the polygon, using vertex data corresponding to the polygon;

means for transmitting in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations with the same memory address corresponds to a different one of the group of two or more neighboring sample positions;

means for rendering a depth value individually for each of the two or more neighboring samples within the polygon, using depth value data corresponding to the polygon;

means for compressing the depth values; and means for transmitting the compressed depth values to the memories.

26. A graphics system for rendering three-dimensional images with a sample grouping mode option, the system comprising:

a plurality of processor enhanced memories for storing parameter data for a plurality of neighboring samples; and one or more render processors coupled to the plurality of memories, wherein the render processors are operable to:

render parameter values for a selected sample in the plurality of neighboring samples, transmit in a single write transaction to store at the same time the parameter values rendered only for the one selected sample position in each of a plurality of memory locations, wherein each of the memory locations has the same address in a different one of a plurality of processor enhanced memories, and wherein each of the plurality of memory locations with the same memory address corresponds to a different one of the group of two or more neighboring sample positions;

determine depth value parameters that define depth within the sample space region enclosing the group of neighboring sample positions, and transmit the depth parameters to the memories for calculation of individual depth values for each of the plurality of memory locations.

27. The system of claim 26, wherein the plurality of memories comprise means for regenerating a sample location in sample space corresponding to a sample and determining a depth value for the sample location.

28. The system of claim 27, wherein the means for regenerating sample locations further comprises one or more sample location units and one or more data processors, wherein the one or more data processors are configured to retrieve a sample location corresponding to a sample position from the one or more sample location units and determine a depth for the sample location using the depth parameters.

29. The system of claim 26, further comprising one or more graphics processors, wherein the graphics processors are configured to generate vertex data corresponding to a polygon, and transmit the vertex data to the render processors.

30. The system of claim 26, further comprising one or more sample filtering units configured to filter sample data to pixel data.

31. The system of claim 30, further comprising one or more display devices connected to the sample filtering units.

32. The system of claim 31, further comprising one or more input devices connected to the graphics system for inputting graphics information or instructions.

33. The system of claim 26, further comprising:

one or more graphics processors, wherein the graphics processors are configured to generate vertex data corresponding to a polygon, and send the vertex data to the render processors;

one or more sample filtering units configured to filter sample data to pixel data;

one or more display devices connected to the sample filtering units; and one or more input devices connected to the graphics system for inputting graphics information or instructions.

34. The system of claim 26, wherein the render processors further comprise one or more data compressor units configured to compress depth value data for each of the sample positions in the group of neighboring sample positions, and wherein the plurality of memories further comprise one or more data de-compressor units and one or more data processors configured to receive the compressed data, de-compress the data, and output depth values for each of the sample positions in the group of neighboring sample positions.

35. The system of claim 26, wherein sample grouping mode is selected for one or more graphics objects, and the specification of sample grouping mode is incorporated with the graphics data for polygons corresponding to the objects.

36. The system of claim 26, wherein sample grouping mode is set by a user for all processing, for the processing of specified regions of the image, or for processing large objects with insubstantial differences in color.

37. The system of claim 26, wherein the number of samples replicated in sample grouping mode may be varied dynamically to accommodate changes in image complexity in real time.

* * * * *